US012802480B2

(12) United States Patent
Chae et al.

(10) Patent No.: US 12,802,480 B2
(45) Date of Patent: Nov. 17, 2026

(54) IMAGE PROCESSING SYSTEM, IMAGE PROCESSING METHOD, AND PROGRAM

(71) Applicant: RAKUTEN GROUP, INC., Tokyo (JP)

(72) Inventors: Yeongnam Chae, Tokyo (JP); Preetham Prakasha, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 353 days.

(21) Appl. No.: 18/687,770

(22) PCT Filed: Mar. 22, 2022

(86) PCT No.: PCT/JP2022/013064
§ 371 (c)(1),
(2) Date: Feb. 28, 2024

(87) PCT Pub. No.: WO2023/181102
PCT Pub. Date: Sep. 28, 2023

(65) Prior Publication Data

US 2025/0140010 A1 May 1, 2025

(51) Int. Cl.
*G06V 30/41* (2022.01)
*G06V 30/10* (2022.01)

(52) U.S. Cl.
CPC .............. *G06V 30/41* (2022.01); *G06V 30/10* (2022.01)

(58) Field of Classification Search
USPC .......................................... 382/181, 209, 229
See application file for complete search history.

(56) References Cited

U.S. PATENT DOCUMENTS 6,246,794 B1 6/2001 Kagehiro et al.
7,590,275 B2 * 9/2009 Clarke ............... G06V 30/2253 382/137
10,452,897 B1 * 10/2019 Benkreira ............ G06V 40/172
2006/0045322 A1 * 3/2006 Clarke ............... G06V 30/2253 382/137

(Continued)

FOREIGN PATENT DOCUMENTS

JP 2004-272396 A 9/2004
JP 2007-233913 A 9/2007

(Continued)

OTHER PUBLICATIONS

Office Action of Jan. 6, 2026, for related U.S. Appl. No. 18/687,793, pp. 1-24.
Search Report of Dec. 4, 2024, for corresponding EP Patent Application No. 22933251.5, pp. 1-9.
Search Report of Nov. 5, 2024, for related EP Patent Application No. 22933252.3, pp. 1-9.

(Continued)

*Primary Examiner* — Ishrat I Sherali
(74) *Attorney, Agent, or Firm* — HEA Law PLLC

(57) ABSTRACT

An image processing system, comprising at least one processor configured to: detect a character string region including any character string from a target object image relating to a target object including a standard character string; apply character recognition to the character string region to calculate a score relating to a result of the character recognition for each character included in the character string region; and determine whether the character string region is a standard region including the standard character string based on the score calculated for the each character.

19 Claims, 14 Drawing Sheets

(56) References Cited

U.S. PATENT DOCUMENTS

| | | | | |
|---|---|---|---|---|
| 2007/0206884 | A1* | 9/2007 | Kato | G06V 30/262 382/229 |
| 2011/0097002 | A1* | 4/2011 | Ishiguro | G06V 30/158 382/229 |
| 2018/0330180 | A1 | 11/2018 | Wang et al. | |
| 2020/0250139 | A1 | 8/2020 | Muffat et al. | |
| 2021/0097273 | A1 | 4/2021 | Patwardhan et al. | |
| 2021/0174069 | A1* | 6/2021 | Benkreira | H04W 12/06 |
| 2021/0209393 | A1* | 7/2021 | Chae | G06T 3/18 |
| 2024/0193974 | A1* | 6/2024 | Chae | G06T 7/00 |
| 2024/0257546 | A1* | 8/2024 | Chae | G06V 10/25 |
| 2024/0362938 | A1* | 10/2024 | Chae | G06V 20/62 |

FOREIGN PATENT DOCUMENTS

| | | | |
|---|---|---|---|
| JP | 2007-241442 | A | 9/2007 |
| WO | 2020/008628 | A1 | 1/2020 |

OTHER PUBLICATIONS

International Search Report of May 31, 2022 for International Patent Application No. PCT/JP2022/013064 with English translation, pp. 1-4.

International Search Report of May 31, 2022 for International Patent Application No. PCT/JP2022/013065, pp. 1-9 (for concise explanation of relevance).

* cited by examiner

FIG.6

<table>
<tr><th rowspan="2">CHARACTER STRING REGION</th><th colspan="3">FIRST CHARACTER</th><th colspan="3">SECOND CHARACTER</th></tr>
<tr><th>No</th><th>RECOGNIZABLE CHARACTER</th><th>SCORE</th><th>No</th><th>RECOGNIZABLE CHARACTER</th><th>SCORE</th></tr>
<tr><td rowspan="5">R3</td><td>1</td><td>1</td><td>95</td><td>1</td><td>D</td><td>87</td></tr>
<tr><td>2</td><td>l</td><td>88</td><td>2</td><td>O</td><td>84</td></tr>
<tr><td>3</td><td>I</td><td>84</td><td>3</td><td>B</td><td>81</td></tr>
<tr><td>4</td><td>|</td><td>83</td><td>4</td><td>R</td><td>76</td></tr>
<tr><td>5</td><td>L</td><td>79</td><td>5</td><td>β</td><td>73</td></tr>
<tr><td rowspan="5">R5</td><td>1</td><td>O</td><td>89</td><td>1</td><td>l</td><td>93</td></tr>
<tr><td>2</td><td>0</td><td>84</td><td>2</td><td>I</td><td>91</td></tr>
<tr><td>3</td><td>o</td><td>81</td><td>3</td><td>1</td><td>89</td></tr>
<tr><td>4</td><td>Q</td><td>78</td><td>4</td><td>L</td><td>85</td></tr>
<tr><td>5</td><td>D</td><td>74</td><td>5</td><td>|</td><td>83</td></tr>
<tr><td rowspan="5">R9</td><td>1</td><td>S</td><td>90</td><td>1</td><td>β</td><td>88</td></tr>
<tr><td>2</td><td>$</td><td>88</td><td>2</td><td>B</td><td>84</td></tr>
<tr><td>3</td><td>s</td><td>83</td><td>3</td><td>6</td><td>75</td></tr>
<tr><td>4</td><td>8</td><td>79</td><td>4</td><td>8</td><td>73</td></tr>
<tr><td>5</td><td>6</td><td>71</td><td>5</td><td>S</td><td>68</td></tr>
<tr><td rowspan="5">R11</td><td>1</td><td>M</td><td>93</td><td>1</td><td>B</td><td>92</td></tr>
<tr><td>2</td><td>N</td><td>91</td><td>2</td><td>β</td><td>90</td></tr>
<tr><td>3</td><td>n</td><td>84</td><td>3</td><td>8</td><td>84</td></tr>
<tr><td>4</td><td>H</td><td>80</td><td>4</td><td>S</td><td>81</td></tr>
<tr><td>5</td><td>m</td><td>74</td><td>5</td><td>6</td><td>75</td></tr>
<tr><td>⋮</td><td>⋮</td><td>⋮</td><td>⋮</td><td>⋮</td><td>⋮</td><td>⋮</td></tr>
</table>

IMAGE PROCESSING SYSTEM, IMAGE PROCESSING METHOD, AND PROGRAM

CROSS REFERENCE TO RELATED APPLICATIONS

This application is a National Stage of International Application No. PCT/JP2022/013064 filed on Mar. 22, 2022. The contents of the above document are incorporated herein by reference in its entirety.

TECHNICAL FIELD

The present relates to an image processing system, an image processing method, and a program.

BACKGROUND ART

Hitherto, there has been known a technology of identifying, from a target object image relating to a target object including a standard character string, a standard region including the standard character string. For example, in Patent Literature 1, there is described a technology of applying pattern matching to a target object image relating to an identity verification document being an example of the target object including the standard character string through use of a template image relating to the standard character string, to thereby identify the standard region.

In the technology as described in Patent Literature 1, the standard region is identified in order to shape the target object image such that the identity verification document faces forward. For example, the standard region may be identified for such a purpose as determining whether or not a predetermined target object is shown in the target object image or such a purpose as identifying a non-standard character string corresponding to the standard character string. The standard region can be used also for other various purposes, and hence it is useful to identify the standard region from the target object image.

CITATION LIST

Patent Literature

[PTL 1] WO 2020/008628 A1

SUMMARY OF INVENTION

Technical Problem

The target objects including the standard character string have various formats, and hence it is difficult to identify the standard region from the target object image. For example, it is conceivable to apply character recognition to the target object image, to thereby identify the standard region from the target object image. However, when the target object image is not clear or the target object is not photographed from the front side, accurate character recognition may not be executed. In this case, the standard region cannot be identified from the target object image.

One object of the present disclosure is to reliably identify, from a target object image relating to a target object including a standard character string, a standard region including the standard character string.

Solution to Problem

According to one embodiment of the present disclosure, there is provided an image processing system including: a detection module configured to detect a character string region including any character string from a target object image relating to a target object including a standard character string; a character recognition module configured to apply character recognition to the character string region to calculate a score relating to a result of the character recognition for each character included in the character string region; and a standard region determination module configured to determine whether the character string region is a standard region including the standard character string based on the score calculated for the each character.

Advantageous Effects of Invention

According to the present disclosure, from the target object image relating to the target object including the standard character string, the standard region including the standard character string can reliably be identified.

BRIEF DESCRIPTION OF DRAWINGS

FIG. 6 is a table for showing an example of an execution result of character recognition applied to the character string regions.

DESCRIPTION OF EMBODIMENTS

1. Overall Configuration of Image Processing System

Figure 1:
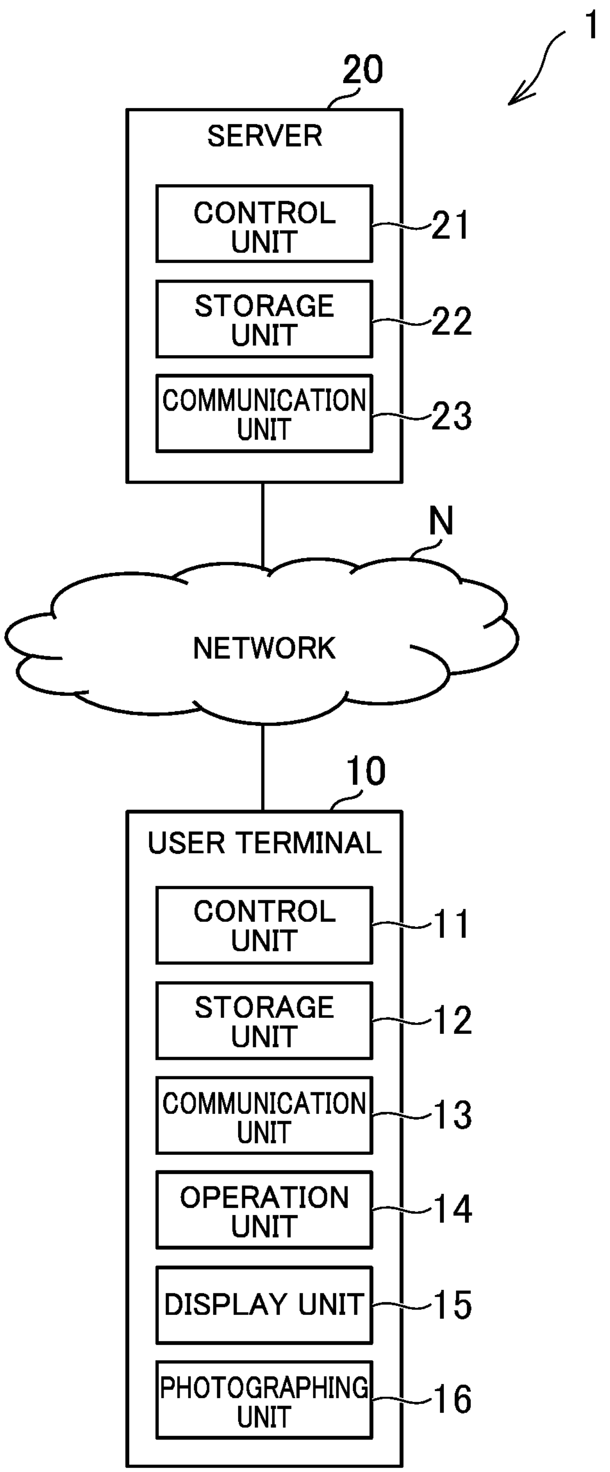
FIG. 1 is a diagram for illustrating an example of an overall configuration of an image processing system.

One example of an embodiment of an image processing system according to the present disclosure is described. FIG. 1 is a diagram for illustrating an example of an overall configuration of the image processing system. For example, an image processing system 1 includes a user terminal 10 and a server 20. The user terminal 10 and the server 20 are connectable to a network N, which is the Internet, a LAN, or the like. It is sufficient for the image processing system 1 to include at least one computer, and the image processing system 1 is not limited to the example of FIG. 1.

The user terminal 10 is a computer of a user. For example, the user terminal 10 is a smartphone, a tablet terminal, a personal computer, or a wearable terminal. A control unit 11 includes at least one processor. A storage unit 12 includes a volatile memory that is a RAM or the like and a non-volatile memory that is a flash memory or the like. A communication unit 13 includes at least one of a communication interface for wired connection or a communication interface for wireless communication. An operation unit 14 is an input device such as a touch panel. A display unit 15 is a liquid crystal display or an organic EL display. A photographing unit 16 includes at least one camera.

The server 20 is a server computer. A control unit 21, a storage unit 22, and a communication unit 23 may have the same physical configurations as the physical configurations of the control unit 11, the storage unit 12, and the communication unit 13, respectively.

Programs stored in the storage units 12 and 22 may be supplied via the network N. The user terminal 10 or the server 20 may include a reading unit (for example, an optical disc drive or a memory card slot) for reading a computer-readable information storage medium, or an input/output unit (for example, a USB port) for data input from/output to an external device. For example, a program stored on an information storage medium may be supplied via the reading unit or the input/output unit.

2. Outline of Image Processing System

This embodiment takes as an example a case of applying the image processing system 1 to electronic Know Your Customer (eKYC), which is identity verification executed online. Any service can use eKYC. For example, eKYC is usable in a communication service, a financial service, an electronic settlement service, an electronic commerce service, an insurance service, or a government service.

In eKYC, an identity verification document (identity document) of a user is checked. The identity verification document is a document which can prove that the user is the person himself or herself. The description of this embodiment takes a health insurance ID card as an example of the identity verification document. Accordingly, "health insurance ID card" in the description can be read as an identity verification document. The identity verification document may be of any type, and is not limited to the health insurance ID card. For example, the identity verification document may be a driver's license, a residence certificate, a personal identification number card, or a passport.

Figure 2:
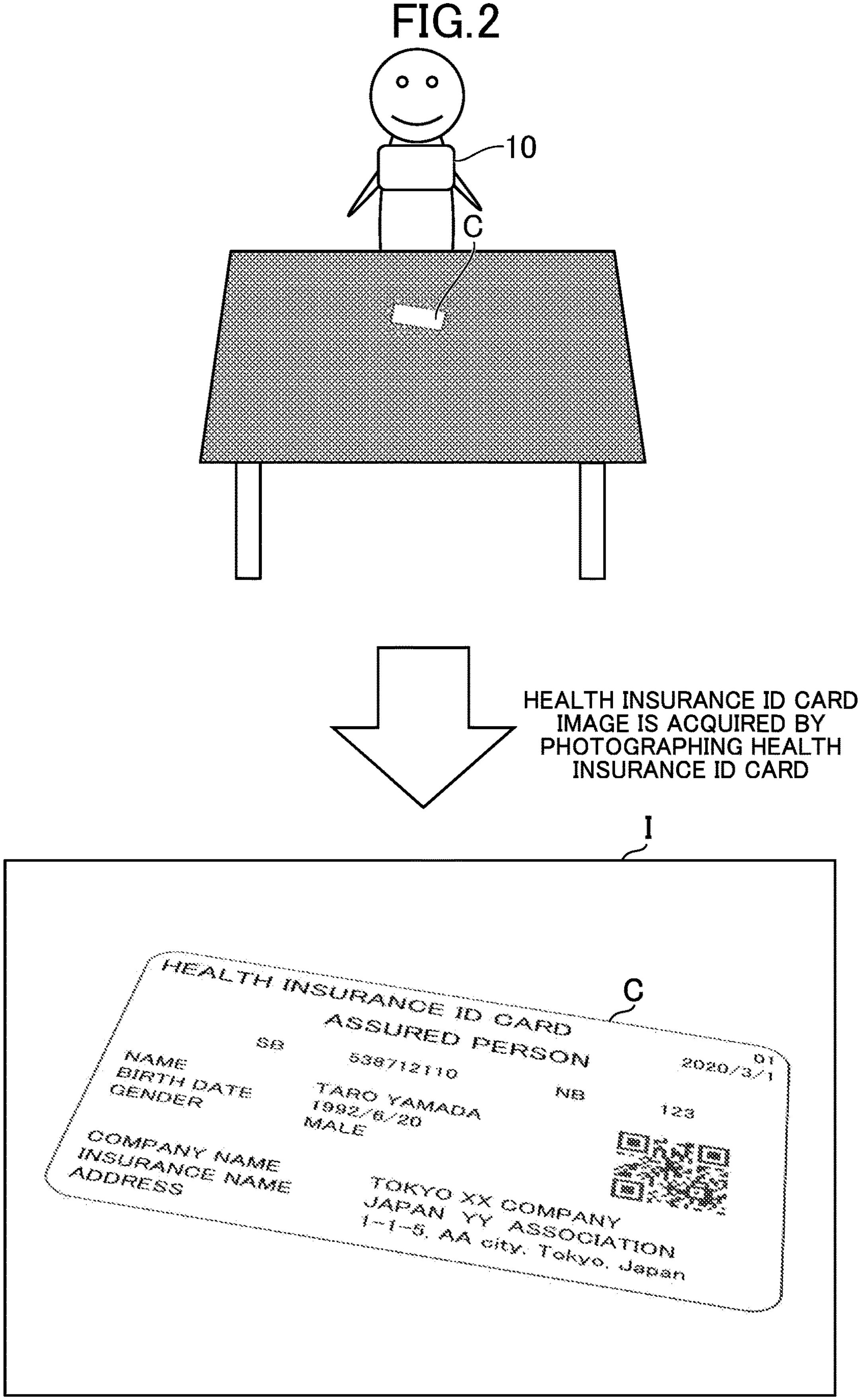
FIG. 2 is a view for illustrating an example of a scene in which a user photographs a health insurance ID card.

FIG. 2 is a view for illustrating an example of a scene in which the user photographs the health insurance ID card. For example, the user uses the photographing unit 16 to photograph an own health insurance ID card C. The health insurance ID card C of FIG. 2 is imaginary. The user terminal 10 generates a health insurance ID card image I showing the health insurance ID card C. The health insurance ID card image I is uploaded to the server 20. When the health insurance ID card image I is uploaded, the ekYC is executed. The ekYC may automatically be executed through use of image processing, or may be executed through visual inspection by an administrator of the service.

For example, on the health insurance ID card C, both of information required for the ekYC and information not required for the ekYC are printed. In this embodiment, it is assumed that the information required for the ekYC includes a name, a birth date, and a gender. It is assumed that the information not required for the ekYC includes a business place reference number which can identify a business place to which an assured person belongs, a personal number which can identify an individual in the same business place, and other information. In FIG. 2, "538712110" printed next to "SB," which is an abbreviation for "Symbol," is the business place reference number, and "123" printed next to "NB," which is an abbreviation for "Number," is the personal number.

The business place reference number and the personal number are information required for coverage by the insurance, and hence a serious problem possibly occurs when those numbers are stolen by a third party. For example, it is assumed that the health insurance ID card image I which shows the health insurance ID card as it is uploaded. When a malicious third party illegally acquires the health insurance ID card image I, the third party can know the business place reference number and the personal number. In this case, the third party possibly misuses the business place reference number and the personal number to impersonate the user, to thereby illegally receive the coverage by the insurance.

In order to hide the business place reference number and the personal number from the third party, it is conceivable to mask regions of the business place reference number and the personal number of the health insurance ID card image I. When appropriate regions are successfully masked, even when the third party illegally acquires the health insurance ID card image I, the third party cannot know the business place reference number and the personal number. In this embodiment, the business place reference number and the personal number are the information not required for the ekYC, and hence even when the masking is applied, a problem does not occur in the eKYC.

However, the health insurance ID cards C have various layouts, and hence it is difficult to identify the regions of the health insurance ID card image I to be masked. In this respect, it is assumed that the health insurance ID cards C are different from one another in layout, but are the same in such a point that the business place reference number and the personal number are printed next to "SB" and "NB," respectively. However, it is assumed that positions at which "SB" and "NB" are printed on the health insurance ID cards C vary depending on issuers of the health insurance ID cards C.

In the case of the above-mentioned health insurance ID card C, it is considered that the business place reference number and the personal number can be hidden from the third party by masking, when the regions of "SB" and "NB" can be identified from the health insurance ID card image I, regions next to the identified regions. However, the printed positions of "SB" and "NB" vary depending on the issuers of the health insurance ID cards C, and hence it is required to apply some image processing to the health insurance ID card image I, to thereby identify the regions.

For example, it is conceivable to apply character recognition to the entire health insurance ID card image I, to thereby recognize character strings of "SB" and "NB." However, as illustrated in FIG. 2, when the health insurance ID card C shown in the health insurance ID card image I is warped or distorted, an accuracy of the character recognition decreases. Further, when a character having a simple shape is included in a recognized character string, erroneous recognition possibly occurs. In this case, the masking itself cannot possibly be executed or an erroneous place is possibly masked.

Thus, the image processing system 1 according to this embodiment includes a first configuration for accurately identifying the regions of "SB" and "NB" from the health insurance ID card image I and a second configuration for accurately identifying the regions of the business place reference number and the personal number from the regions of "SB" and "NB," thereby being capable of masking appropriate regions. Details of the first configuration and the second configuration are now described.

3. Functions Implemented in Image Processing System

Figure 3:
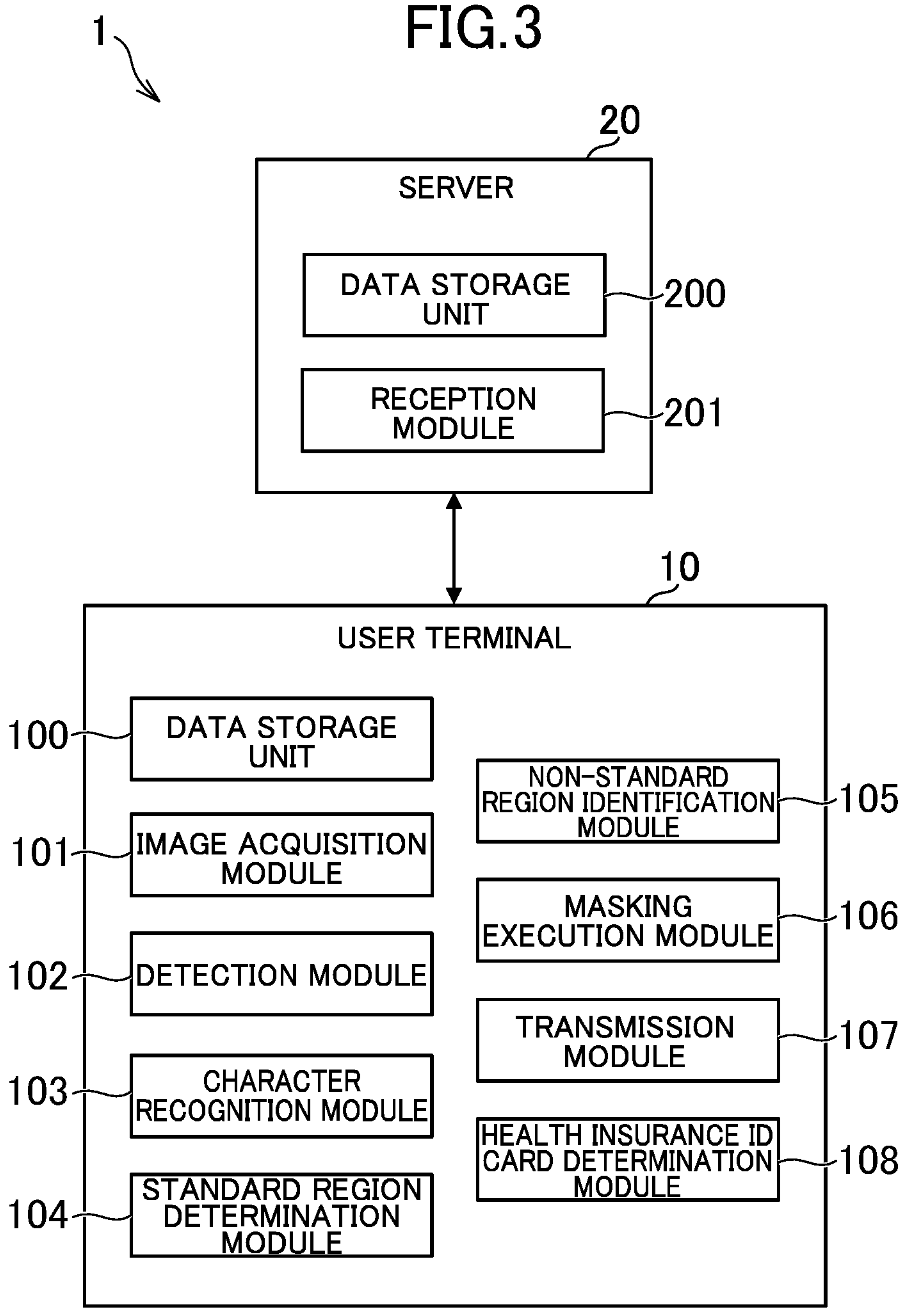
FIG. 3 is a function block diagram for illustrating an example of functions implemented in the image processing system.

FIG. 3 is a function block diagram for illustrating an example of functions implemented in the image processing system 1. In this embodiment, a case in which main image processing is executed in the user terminal 10 is exemplified.

[3-1. Functions Implemented in User Terminal]

A data storage unit 100 is implemented mainly by the storage unit 12. An image acquisition module 101, a detection module 102, a character recognition module 103, a standard region determination module 104, a non-standard region identification module 105, a masking execution module 106, a transmission module 107, and a health insurance ID card determination module 108 are implemented mainly by the control unit 11. The detection module 102, the character recognition module 103, and the standard region determination module 104 mainly relate to the first configuration. The detection module 102, the standard region determination module 104, and the non-standard region identification module 105 mainly relate to the second configuration.

[Data Storage Unit]

The data storage unit 100 stores data required for image processing in this embodiment. For example, the data storage unit 100 stores an app for using the service described above. In this embodiment, a case in which image processing is executed as processing of this app is described. However, image processing may be executed as processing of any program. For example, image processing may be executed as a script executed from a browser or as processing of another program. The data storage unit 100 may store the health insurance ID card image I. For example, the data storage unit 100 may store information indicating a standard character string described later.

Image Acquisition Module

The image acquisition module 101 acquires the health insurance ID card image I. In this embodiment, the health insurance ID card image I is an image generated by photographing the health insurance ID card C. Thus, description is given of a case in which the image acquisition module 101 acquires the health insurance ID card image I generated by the photographing unit 16. The photographing unit 16 is an example of image generation means. The image acquisition module 101 may acquire the health insurance ID card image I from other image generation means such as a scanner, a copying machine, or a multifunction machine. The image acquisition module 101 may acquire the health insurance ID card image I stored in advance in the data storage unit 100, or may acquire the health insurance ID card image I from another computer other than the user terminal 10 or another information storage medium.

The health insurance ID card image I is an example of a target object image. Thus, a portion describing the health insurance ID card image I can be read as "target object image." The target object image is an image relating to a target object. In the target object image, at least a part of the target object is shown. In this embodiment, description is given of a case in which each of individual images (frames) included in a moving image generated in a moving image mode corresponds to the target object image, but a still image generated in a still image mode may correspond to the target object image. The target object image is not limited to a photograph showing a state of an actual space, but may be a computer graphic or an image obtained by adding digital information such as a character string to a photograph.

The health insurance ID card C is an example of a target object. Thus, a portion describing the health insurance ID card C can be read as "target object." The target object is an object shown in the target object image. The target object can also be considered as an object being a target of the image processing. In this embodiment, a scene of an actual space is shown in the target object image, and hence the target object is a subject in the actual space. When the target object image is a computer graphic, the target object is a three-dimensional model in a virtual space or a two-dimensional image.

For example, the target object may be another identity verification document other than the health insurance ID card C. The examples of the another identity verification document are as described above. The target object may be another object other than the identity verification document. The target object is only required to be an object having a predetermined format. For example, the target object may be a receipt, an invoice, an application form, an administrative document, a financial report, a newspaper, a magazine, another type of book, a signboard, a poster, or an advertisement.

In this embodiment, a case in which the target object includes standard character strings and non-standard character strings, but the target object may include only standard character strings, and may not include non-standard character strings. The target object may include a plurality of standard character strings and a plurality of non-standard character strings. The target object may include only one standard character string and only one non-standard character string. The number of standard character strings and the number of non-standard character strings included in the target object may be different from each other.

The standard character string is a character string in a format portion. The standard character string has a fixed sequence of characters. The standard character string is a character string which does not change depending on the health insurance ID card C. In this embodiment, the target object is the identity verification document, and hence the standard character strings are character strings relating to information required to verify identity. This information may be referred to as "personal information." For example, the personal information includes a name, a birth date, a gender, an address, or a telephone number. The standard character strings of a certain health insurance ID card C and the standard character strings of another health insurance ID card C are the same. Character strings common to a plurality of health insurance ID cards C corresponds to the standard character strings. That is, a character string included in any health insurance ID card C in principle corresponds to the standard character string. The standard character string is not limited to a character string input by a computer, but may be a hand-written character string.

For example, the standard character string is an item name. In the example of FIG. 2, item names such as "SB" and "NB" both correspond to the standard character strings. Thus, a portion describing one of "SB" and "NB" can be read as "standard character string." For example, "SB" is an example of a first standard character string. "NB" is an example of a second standard character string. Three or more standard character strings may be included in the health insurance ID card C, and a standard character string being a third or subsequent standard character string may exist. When other character strings indicating item names such as "HEALTH INSURANCE ID CARD" and "NAME" printed on the health insurance ID card C exist on other health insurance ID cards C in principle, those other character strings also correspond to standard character strings. However, in this embodiment, it is assumed that those character strings are not to be identified.

The non-standard character string is a character string in a portion other than the format portion. The non-standard character string has a non-fixed sequence of characters. The non-standard character string is a character string which possibly changes depending on the health insurance ID card C. The non-standard character strings are character strings other than the standard character strings. In this embodiment, the target object exemplified by the health insurance ID card C is the identity verification document, and hence the non-standard character strings are character strings relating to information required to verify the identity. Even when layouts of a plurality of health insurance ID cards C are the same as one another, the non-standard character strings are possibly different from one another. That is, a character string common to only certain limited health insurance ID cards C and a character string that is never the same as those of the other health insurance ID cards C correspond to the non-standard character strings. In this embodiment, a non-standard character string exists for each standard character string. Thus, the standard character string and the non-standard character string form a set. The non-standard character string is not limited to a character string input by a computer, but may be a hand-written character string.

For example, when the standard character string corresponds to an item name, the non-standard character string is specific information on an item indicated by the standard character string. In the example of FIG. 2, both of "538712110" being the business place reference number and "123" being the personal number correspond to the non-standard character strings. Thus, a portion describing each of those numbers can be read as "non-standard character string." Other character strings such as the name and the birth date printed on the health insurance ID card C also correspond to the non-standard character strings. However, in this embodiment, those other character strings are not to be masked, and hence it is assumed that those other character strings are not identified.

Detection Module

The detection module 102 detects, from the health insurance ID card image I, character string regions each including any character string. The character string region is a region of the health insurance ID card image I that includes some character string. The character string is a sequence of a plurality of characters. In this embodiment, it is assumed that the character string region is a quadrangle, but the character string region may have any shape. For example, the character string shape may be a polygon other than the quadrangle, a circle, or an ellipsoid. The character string region is also sometimes referred to as "bounding polygon" or "bounding box." The character string included in the character string region may be a word or a character string other than a word.

The detection module 102 extracts, from the health insurance ID card image I, as the character string regions, regions in which shapes each estimated as a character are continuous to each other. However, it is assumed that the detection module 102 does not go so far as to recognize included specific characters. Thus, the image processing executed by the detection module 102 is different from character recognition executed by the character recognition module 103 described later. For example, the detection module 102 may detect the character string region through image processing simpler than the character recognition. In this embodiment, description is given of the case in which the detection module 102 detects the plurality of character string regions from the health insurance ID card image I, but the detection module 102 may detect only one character string region.

Figure 4:
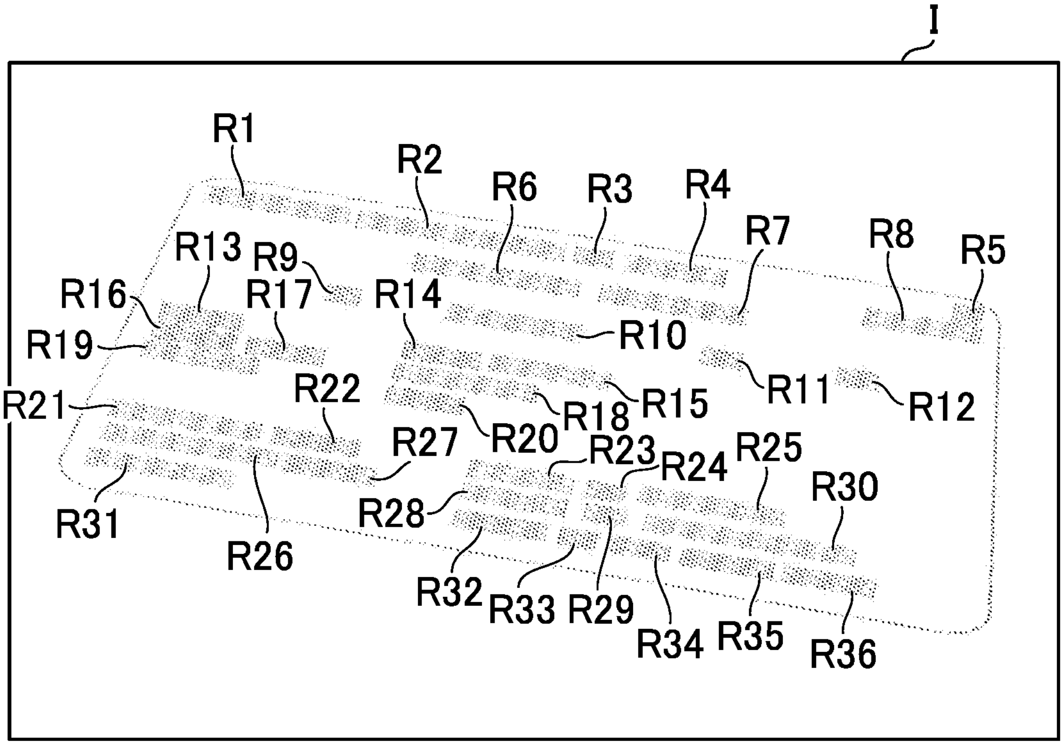
FIG. 4 is a view for illustrating an example of character string regions detected from a target object image.

FIG. 4 is a view for illustrating an example of the character string regions detected from the health insurance ID card image I. In this embodiment, there is exemplified a case in which the detection module 102 uses a method called "scene text detection" to detect character string regions R1 to R36 from the health insurance ID card image I. When the character string regions R1 to R36 are not distinguished from one another, each of the character string regions R1 to R36 is hereinafter simply referred to as "character string region R." Portions of the health insurance ID card C that correspond to a two-dimensional code and the like do not include characters and hence are not detected as the character string regions R. In FIG. 4, only a contour of the health insurance ID card C is represented as dotted lines in order to enable the character string regions R to be easily recognized, but it is assumed that the health insurance ID chard C is not actually deleted from the health insurance ID card image I. This point applies to other drawings such as FIG. 5.

The scene text detection is a method of detecting a text included in a scene. In this embodiment, as an example of the scene text detection, a method of "Character Region Awareness for Text Detection" (https://arxiv.org/pdf/1904.01941v1.pdf) of Youngmin Baek et al. is described. The method of Youngmin Baek et al. does not detect the character string region R through an object detection method, but detects first regions estimated as characters and second regions estimated as blanks between the characters, to thereby detect the character string region R.

For example, the detection module 102 inputs the health insurance ID card image I to a trained machine learning model which can output two heat maps being a first heatmap for each character as a unit and a second heatmap for a blank between the characters. The first heatmap is a map indicating a probability of being a character. For example, on the first heatmap, a color of a pixel is darker as a probability that the pixel is a pixel indicating the character is higher. The second heatmap is a map indicating a probability of being the blank between the characters. For example, on the second heatmap, a color of a pixel is darker as a probability that the pixel is a pixel indicating the blank between the characters is higher.

It is assumed that the machine learning model can output the first heatmap and the second heatmap, but does not go so far as to identify characters included in the health insurance ID card image I. The detection module 102 identifies the first region for each character based on the first heatmap. The detection module 102 identifies the second region being the blank between the characters based on the second heatmap. The second region is identified such that the second region straddles the first region of a certain character and the first region of the next character. The detection module 102 connects the first regions and the second regions to each other, to thereby detect the character string region R.

The plurality of standard character strings are included in the health insurance ID card C in this embodiment, and hence the detection module 102 detects the plurality of character string regions R as illustrated in FIG. 4. In those character string regions R, character string regions R of character strings other than “SB” and “NB,” which are required to be finally detected, also exist. This embodiment intends to detect the character string regions R of the standard character strings each including two characters such as “SB” and “NB,” and hence the character recognition module 103 described later has, as targets of the character recognition, character string regions R each having the same number of characters as that of each of the standard character strings. The detection module 102 may detect only the character string regions R having the same number of characters as that of each of the standard character strings.

Figure 5:
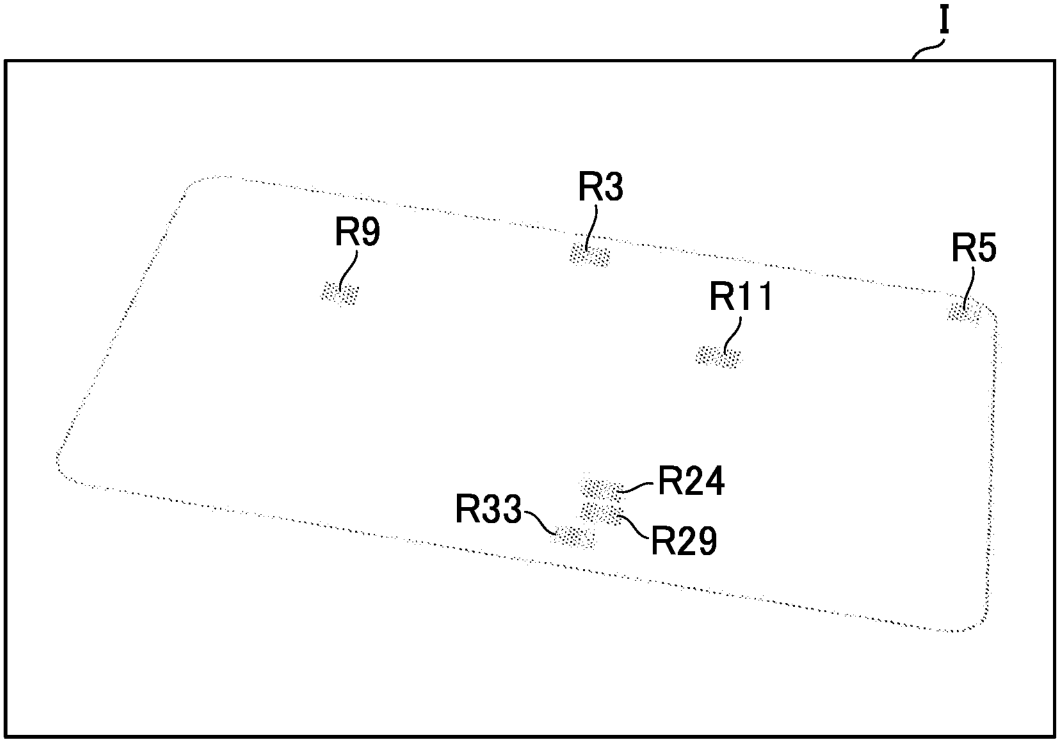
FIG. 5 is a view for illustrating an example of character string regions each having the same number of characters as that of each of standard character strings.

FIG. 5 is a view for illustrating an example of the character string regions R each having the same number of characters as that of each of the standard character strings. For example, in the method of Youngmin Baek et al., the number of first regions coupled via the second regions means the number of characters of the character string included in the character string region R. Thus, the detection module 102 acquires, as the number of characters of the character string included in a certain character string region R, the number of first regions identified when this character string region R is detected. As illustrated in FIG. 5, among the character string regions R1 to R36, character string regions R each having two characters, which is the same number of characters as those of the standard character strings “SB” and “NB,” are the character string regions R3, R5, R9, R11, R24, R29, and R33.

As the scene text detection itself, various methods can be used. For example, the detection module 102 may use another method of the scene text detection such as “An Efficient and Accurate Scene Text Detector” (https://arxiv.org/pdf/1704.03155v2.pdf) of Xinyu Zhou et al. or “Detecting Text in Natural Image with Connectionist Text Proposal Network” (https://arxiv.org/pdf/1609.03605v1.pdf) of Zhi Tian et al. to detect the character string region R.

Moreover, for example, the detection module 102 may use a method other than the scene text detection to detect the character string regions R. For example, the detection module 102 may use the object detection method to detect the character string regions R. The detection module 102 detects a bounding box which bounds a place having a high object feature from the health insurance ID card image I through the object detection method. The detection module 102 may detect, as the character string region R, a region in which bounding boxes each having a size considered as that of a character are disposed side by side at constant intervals.

Moreover, for example, the detection module 102 may use the character recognition to detect the character string region R. As described above, even when the character recognition is applied to the entire health insurance ID card image I, it is difficult to accurately execute the character recognition. However, even when a specific character cannot be identified, an existence of a certain character is possibly identified. Thus, the detection module 102 may detect, as the character string region R, from the health insurance ID card image I, a region in which regions each having an identified certain character are disposed side by side at constant intervals.

Character Recognition Module

The character recognition module 103 applies the character recognition to the character string region R to calculate a score relating to a result of the character recognition for each character included in the character string region R. The character recognition is sometimes called “optical character recognition (OCR).” The character recognition is also sometimes called a name other than the optical character recognition, such as “intelligent character recognition (ICR)” or “intelligent word recognition (IWR).” As the character recognition itself, various methods can be used. For example, a method that uses a machine learning model (method that is so-called “AI OCR”), a method that uses template images, or a method that uses shape features of lines can be used.

The result of the character recognition is content output from an algorithm of the character recognition. For example, each character recognized from the character string region R corresponds to the result of the character recognition. In this embodiment, as illustrated in FIG. 5, the character recognition is applied to the character string regions R including the two characters, and hence the character recognition module 103 recognizes a first character and a second character from the character string region R. Those combinations of the two characters are the result of the character recognition. When a character string of two or more characters is included in the character string region R, the character recognition module 103 similarly acquires as many results of the character recognition as the number of characters included in the character string region R.

The score is an index which indicates correctness of the result of the character recognition. The score is also sometimes referred to as “likelihood.” In this embodiment, a case in which the score is expressed in a numerical value is described, but the score may be expressed in another index such as a character or another symbol. A higher score means that the result of the character recognition is more correct. In this embodiment, a case in which the score is expressed in a range of numerical values of from 0 to 100 is described, but the score may be expressed in any other range of numerical values.

As a calculation method itself for the score, various calculation methods can be used. For example, in a method that uses a machine learning model, the score is calculated by an output layer of the machine learning model. This score indicates correctness of character labeling executed by the machine learning model. For example, in the method that uses template images, the score is calculated based on the number of pixels matching the template image or a difference in color from the template image in each pixel. For example, in the method that uses the shape features of the lines, the score is calculated based on a difference from a shape serving as a reference. As those differences are smaller, the score increases.

FIG. 6 is a table for showing an example of an execution result of the character recognition applied to the character string regions R. In this embodiment, a plurality of recognizable characters can be recognized through use of the character recognition. The character recognition module 103 calculates, for each character, the score of each of the plurality of recognizable characters. The recognizable character is character recognizable through use of the character recognition. For example, in the character recognition that uses the machine learning model, a character learned by the machine learning model corresponds to the recognizable character. In the character recognition that uses the template images, a character prepared as the template image corresponds to the recognizable character. In the character recognition that uses the shape of the character, a character having a prepared shape serving as the reference corresponds to the recognizable character.

The recognizable character can be considered also as "character being a candidate in the character recognition." For example, in English, several tens to several hundreds of recognizable characters such as the alphabet, the numbers, and other symbols exist. The recognizable characters vary depending on the language or the character recognition method. The character recognition module 103 can recognize recognizable characters corresponding to the language being the target of the character recognition and the method to be used in the character recognition. For example, in Japanese, approximately forty thousand characters can be recognized, and hence the character recognition module 103 may calculate the score for each of the forty thousand characters. In another language as well, the character recognition module 103 similarly calculates the score for each of the recognizable characters in this language.

For example, the character recognition module 103 calculates a score of the first character and a score of the second character of each pair of the recognizable characters. In this embodiment, the health insurance ID card C written in English is exemplified, and hence the character recognition module 103 calculates the score of the first character and the score of the second character for each of several tens to several hundreds of English recognizable characters. In the example of FIG. 6, for each character string region R, recognizable characters having scores in down to the fifth highest order as the first character and recognizable characters having scores in down to the fifth highest order as the second character are shown, but it is assumed that the scores are also calculated for the other recognizable characters. Thus, recognizable characters having scores in the sixth and lower orders also exist.

For example, a character string "ID" is included in the character string region R3. However, warp and distortion exist in the health insurance ID card C in the health insurance ID card image I as illustrated in FIG. 2, and hence the score of each "I" and "D" is not necessarily in the first order. Further, "I" has a simple shape and is highly likely to be erroneously recognized as another character. Thus, as the first character of the character string region R3, "1", "l", "I", "|", and "L" are recognized in descending order of the score. The correct answer of the first character is "I" having the third highest score, but other characters having similar shapes have higher scores. As the second character of the character string region R3, "D", "O", "B", "R", and "β" are recognized in descending order of the score. The correct answer of the second character is "D" having the highest score. As described above, both of "I" and "D" being the correct answers for the character string region R3 are not necessarily in the first order, but are in down to the fifth highest order.

The same applies to other character string regions R. In this embodiment, also for the other two-character character string regions R5, R9, R11, R24, R29, and R33, as for the character string region R3, the character recognition module 103 identifies recognizable characters having scores in down to the fifth highest order as each of the first and second characters. In the character string region R9 including "SB" being the standard character string required to be identified in this embodiment, both of "S" and "B" are not in the first order, but are in down to the fifth highest order. Similarly, in the character string region R11 including "NB" being the standard character string required to be identified in this embodiment, both of "N" and "B" are not in the first order, but are in down to the fifth highest order.

Standard Region Determination Module

The standard region determination module 104 determines, based on the score calculated for each character, whether or not the character string region R is a standard region including the standard character string. In this embodiment, the plurality of standard character strings are the identification targets, and hence the standard region determination module 104 determines, for each standard character string, whether or not the character string region R is the standard region including this standard character string. For example, "SB" and "NB" exist as the standard character strings, and hence the standard region determination module 104 determines whether or not the character string region R is the standard region of "SB" and whether or not the character string region R is the standard region of "NB."

The standard region is the character string region R including the standard character string. The standard region determination module 104 determines, based on the scores each calculated for a character included in a certain character string region R, whether or not the standard character string is included in this character string region R. In this embodiment, it is determined, based on the score of the first character and the score of the second character of a certain character string region R, whether or not this character string region R is the standard region.

In this embodiment, the standard region determination module 104 identifies, for each character, the recognizable character having a relatively high score as a high-score character from the plurality of recognizable characters. For example, the standard region determination module 104 identifies, for each character, as the high-score character, a recognizable character having an order of the score equal to or higher than a reference order in the character. The reference order is an order serving as a condition for identifying the high-score characters. In the example of FIG. 6, the reference order is the fifth order. The reference order can be set to any order, and is not limited to the fifth order. For example, the reference order may be any one of the first to fourth orders or the sixth or higher orders.

For example, the standard region determination module 104 determines whether or not the standard character string exists in combinations of the high-score characters, to thereby determine whether or not the character string region R is the standard region. In the example of FIG. 6, there exist 25 combinations of the characters in down to the fifth highest order as the first character and the character in down to the fifth highest order as the second character. The standard region determination module 104 determines whether or not a combination matching the standard character string exists in the 25 combinations identified from the certain character string region R.

The determination method for the standard region may be the same even for a case in which the number of characters included in the character string region R is not two. Further, the determination method for the standard region may be the same even for a case in which the reference order is not the fifth order. For example, when "n" ("n" is an integer equal to or larger than 2) characters are included in the character string region R, and characters having scores in down to the m-th ("m" is a natural number) highest order are identified as the high-score characters, the standard region determination module 104 is only required to determine whether or not a combination matching the standard character string exists in $m^n$ combinations.

In this embodiment, the standard region determination module 104 determines whether or not a character string region R having the same number of characters as that of the standard character string is the standard region. The standard region determination module 104 excludes, from the determination targets, character string regions R each having the number of characters different from that of the standard character string. In the example of FIG. 4, the character string regions R1 to R36 are detected, but the determination targets of the standard region determination module 104 are the character string regions R3, R5, R9, R11, R24, R29, and R33 each having two characters as in the standard character strings as illustrated in FIG. 5. In this embodiment, it is assumed that the other character string regions R having the numbers of characters different from that of the standard character strings are not considered as the determination targets of the standard region, but the standard region determination module 104 may determine whether or not each of the other character string regions R is the standard region.

Figure 7:
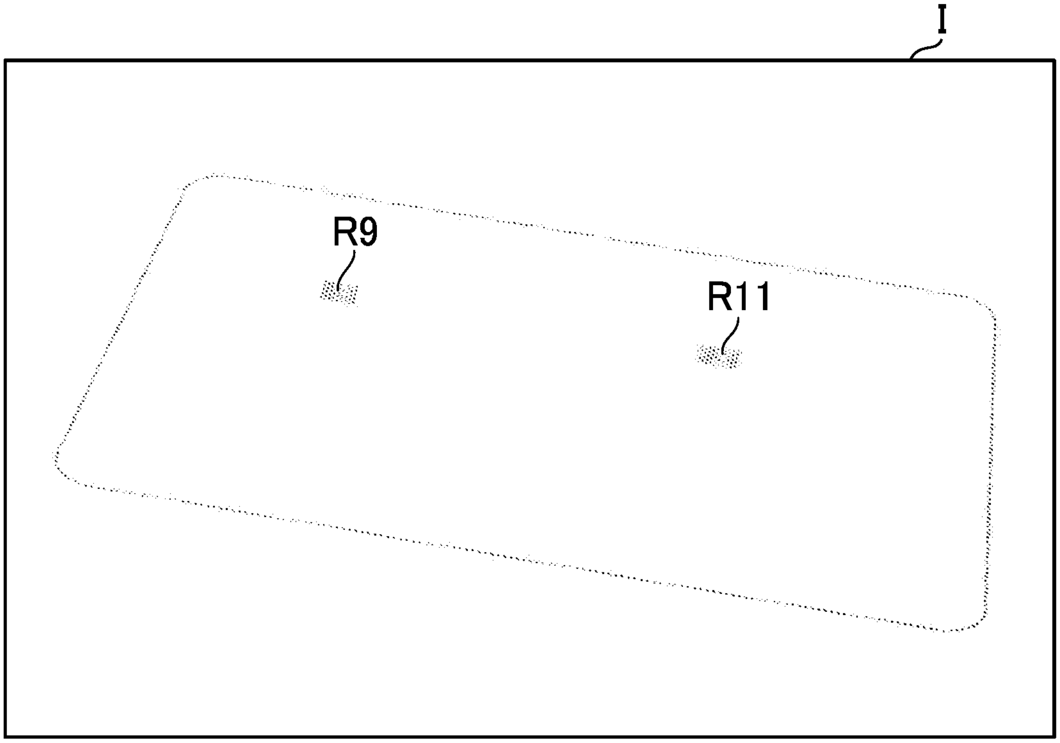
FIG. 7 is a view for illustrating an example of character string regions determined as standard regions.

FIG. 7 is a view for illustrating the character string regions R determined as the standard regions. For example, the standard region determination module 104 determines that a combination of "S" having the score in the first order as the first character of the character string region R9 and "B" having the score in the second order as the second character of the character string region R9 matches "SB" being the standard character string required to be identified. Thus, the standard region determination module 104 determines that the character string region R9 is the standard region of "SB."

For example, the standard region determination module 104 determines that a combination of "N" having a score in the second order as the first character of the character string region R11 and "B" having a score in the first order as the second character of the character string region R9 matches "NB" being the standard character string required to be identified. Thus, the standard region determination module 104 determines that the character string region R11 is the standard region of "NB." As illustrated in FIG. 7, the standard region determination module 104 determines that the character string regions R9 and R11 among the plurality of character string regions R3, R5, R9, R11, R24, R29, and R33 being the determination targets are the standard regions.

In this embodiment, the standard region determination module 104 selects any one of the plurality of character string regions R, and determines whether or not this selected character string region R is the standard region. In this embodiment, the standard region determination module 104 selects one of the plurality of character string regions R one at a time in order from the top of the health insurance ID card image I, and determines whether or not this selected character string region R is the standard region. In the example of FIG. 5, the standard region determination module 104 selects one at a time in the order of the character string regions R3, R5, R9, R11, R24, R29, and R33. The selection order of the character string regions R may be any order, and the character string regions R may be selected in order from the bottom, or may be selected in order from the left or the right.

For example, the standard region determination module 104 finishes the processing without selecting the next character string region R when the character string region R selected as described above is determined as the standard region. In the example of FIG. 5, the standard region determination module 104 has successfully confirmed that both of the two standard character strings exist at the time of the determination for the character string region R11, and hence finishes the processing without making the determination for the character string regions R24, R29, and R33. That is, even when character string regions R having not been determined remain, the standard region determination module 104 does not make the determination for the remaining character string regions R when all of the standard regions have been identified.

For example, when the character string region R selected as described above is not determined as the standard region, the standard region determination module 104 selects the next character string region R, and determines whether or not this selected next character string region R is the standard region. In the example of FIG. 5, the standard region determination module 104 determines that none of the combination of "S" and "B" and the combination of "N" and "B" exist in the first character string region R3, and hence executes the determination processing for the second character string region R5. Subsequently, the standard region determination module 104 selects the character string region R one at a time, and determines whether or not the selected character string region R is the standard region until all of the standard regions are identified.

Non-Standard Region Identification Module

The non-standard region identification module 105 identifies, when the standard region is determined to exist, a character string region R having a predetermined positional relationship with this standard region as a non-standard region including a non-standard character string. The predetermined positional relationship is a positional relationship between the standard character string and the non-standard character string on the health insurance ID card C. The predetermined positional relationship indicates a position at which the non-standard character string is arranged while a position of the standard character string is considered as a reference. The positional relationship can also be considered as a relative position.

It is assumed that the predetermined positional relationship is defined in advance in the data storage unit 100. When a plurality of standard character strings exist on the health insurance ID card C as in this embodiment, the predetermined positional relationship is defined for each standard character string. The non-standard region identification module 105 uses the standard region determined by the standard region determination module 104 as the reference to identify another position having the predetermined positional relationship. The non-standard region identification module 105 identifies a character string region R at the identified another position as the non-standard region corresponding to this standard region.

For example, when a character string region R exists in a predetermined direction with respect to the standard region and within a predetermined distance from the standard region, the non-standard region identification module 105 may determine that this character string region R has the predetermined positional relationship with the standard region. That is, the predetermined positional relationship may be the state in which the character string region R exists in the predetermined direction with respect to the standard region and within the predetermined distance from the standard region. The predetermined positional relationship may not be a range such as being within a predetermined distance, but a pinpoint position. The non-standard region identification module 105 identifies a range in the predetermined direction with respect to the standard region and within the predetermined distance from the standard region, and identifies a character string region R within the identified range as the non-standard region corresponding to this standard region.

The predetermined direction and the predetermined distance corresponding to the predetermined positional relationship are only required to be a direction and a distance defined in advance. The predetermined direction and the predetermined distance are only required to be defined in accordance with an actual positional relationship between the standard character string and the non-standard character string on the health insurance ID card C. In this embodiment, the non-standard character string exists on the right side of the standard character string, and hence the predetermined direction is the right direction. For example, the predetermined direction may be another direction such as the left direction, the upper direction, or the lower direction, or an oblique direction displaced more or less from any one of the upper, lower, left, and right directions. The predetermined distance is only required to be a distance that can be assumed as a distance between the standard character string and the non-standard character string on the health insurance ID card C. For example, the predetermined distance may be a distance of from approximately 1 centimeter to approximately 10 centimeters, a distance equal to or longer than that, or a distance equal to or shorter than that.

Figure 8:
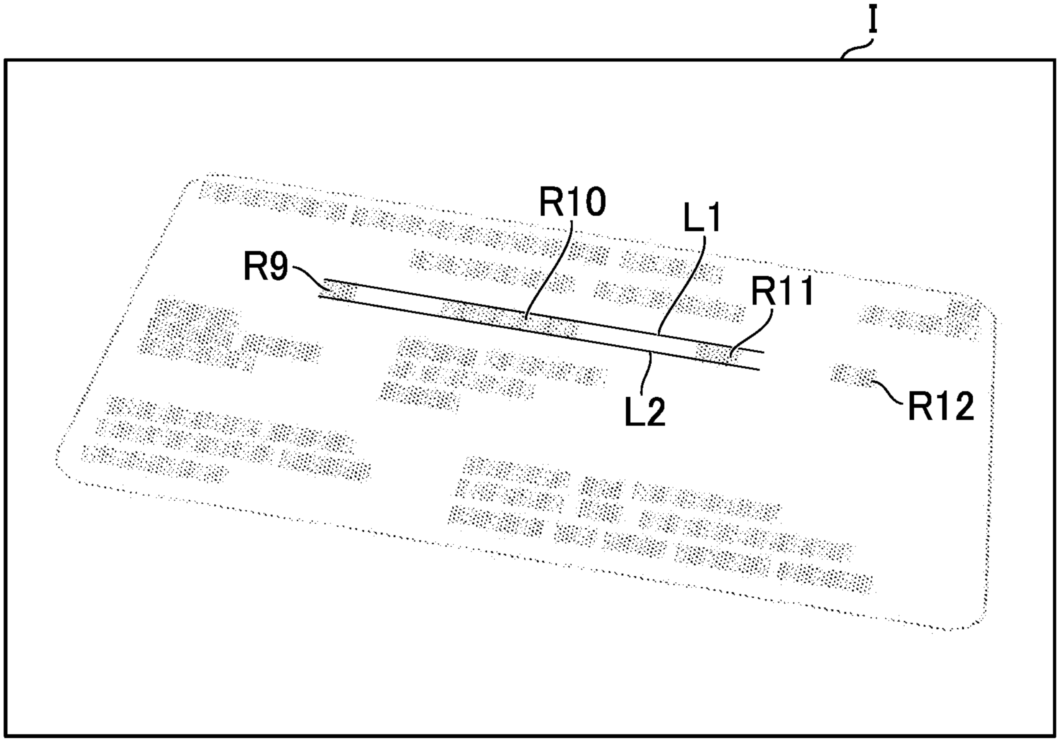
FIG. 8 is a view for illustrating an example of an identification method for a non-standard region.

FIG. 8 is a view for illustrating an example of an identification method for the non-standard region. In FIG. 8, reference symbols are assigned to only the character string regions R9 to R12 among the character string regions R. In this embodiment, the standard region has the shape of the quadrangle, and hence the non-standard region identification module 105 determines, when a character string region R exists on or near lines L1 and L2 obtained by extending at least one side of the character string region R9 being the standard region by the predetermined distance in the predetermined direction, that this character string region R has the predetermined positional relationship with the standard region. The near position is a position within the predetermined distance from each of the lines L1 and L2. The non-standard region identification module 105 may use only one of the side L1 or the side L2 to determine the predetermined positional relationship.

For example, when a character string region R exists on or near two lines obtained by extending two sides L1 and L2 of the standard region that oppose to each other by the predetermined distance in the predetermined direction, the non-standard region identification module 105 determines that this character string region R has the predetermined positional relationship with the standard region. In the example of FIG. 8, the character string regions R10 and R11 are on the lines L1 and L2, and hence the non-standard region identification module 105 temporarily determines that the character string regions R10 and R11 have the predetermined positional relationship with the character string region R9 being the standard region.

Although not shown in FIG. 8, similarly for the character string region R11 being the standard region, when a character string region R exists on or near two lines obtained by extending upper and lower two sides by the predetermined distance in the predetermined direction, the non-standard region identification module 105 determines that this character string region R has the predetermined positional relationship with the standard region. In the example of FIG. 8, those lines are omitted, but it is assumed that only the character string region R12 exists on those lines. The non-standard region identification module 105 determines that the character string region R12 has the predetermined positional relationship with the character string region R11 being the standard region.

For example, when there exists only one character string region R that has a predetermined first positional relationship with the standard region among the plurality of character string regions R, the non-standard region identification module 105 identifies this character string region R as the non-standard region. The first positional relationship is the predetermined positional relationship in the description given above. In the example of FIG. 8, such a relationship that a character string region R exists on or near the line obtained by extending the side of the standard region corresponds to satisfying the first positional relationship. When there exist a plurality of character string regions R having the first positional relationship with the standard region, the non-standard region identification module 105 identifies, as the non-standard region, a character string region R that has a second positional relationship with the standard region among the plurality of character string regions R.

The second positional relationship is a positional relationship determined based on a criterion different from that for the first positional relationship. For example, when there exist a plurality of character string regions R having the first positional relationship with the standard region, the non-standard region identification module 105 identifies, among the plurality of character string regions R, a character string region R that is closest (relatively close) to the standard region as the character string region R having the second positional relationship with the standard region. Thus, such a relationship that a character string region R is close to the standard region corresponds to the second positional relationship. In the example of FIG. 8, of the character string regions R10 and R11 existing on or near the lines L1 and L2, the character string region R10 is closest to the character string region R10 being the standard region, and hence the character string region R10 is identified as the non-standard region. The second positional relationship may be another positional relationship. For example, when another standard region exists in a vicinity of a standard region, the second positional relationship may be such a positional relationship that the character string region R is far from the standard region.

In the example of FIG. 8, in the non-standard region identification module 105, the two character string regions R10 and R11 exist on or near the lines L1 and L2 obtained by extending the sides of the character string region R9 being the standard region. The non-standard region identification module 105 identifies, of the two character string regions R10 and R11, as the first standard region, the character string region R10 that is closer to the character string region R9. Only one character string region R12 exists on or near the lines L1 and L2 obtained by extending the sides of the character string region R11 being the standard region, and hence the non-standard region identification module 105 identifies this character string region R as the second standard region. Thus, the determination of the second positional relationship is not made for the character string region R11.

Masking Execution Module

Figure 9:
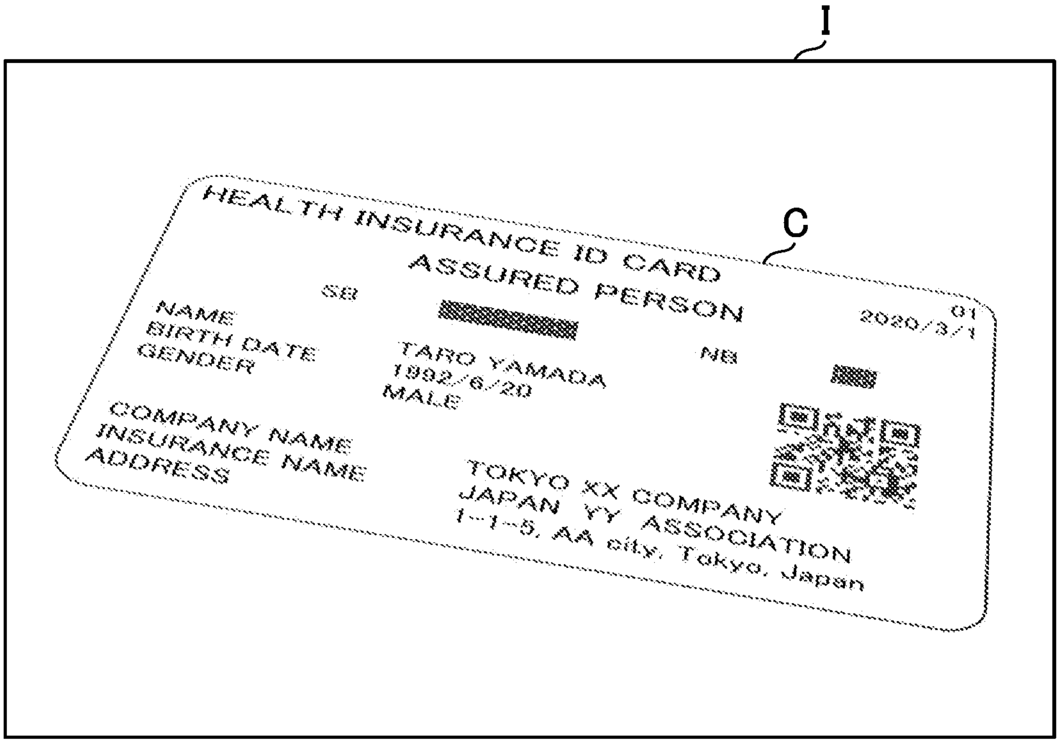
FIG. 9 is a view for illustrating an example of a health insurance ID card image after the non-standard regions are masked.

FIG. 9 is a view for illustrating an example of the health insurance ID card image I after the non-standard regions are masked. The masking execution module 106 masks the non-standard regions. The masking is image processing of hiding the non-standard region. For example, the masking is processing of filling in a predetermined color, processing of mapping a certain image or pattern, processing of cutting the non-standard region, or processing of applying mosaic. As illustrated in FIG. 9, in the health insurance ID card image I, portions corresponding to the character string regions R10 and R12 being the non-standard regions are masked, and hence there is brought about the state in which the character strings of "538712110" and "123" are hidden from a third party.

Transmission Module

The transmission module 107 transmits the masked health insurance ID card image I to the server 20. For example, the transmission module 107 transmits, to the server 20, the health insurance ID card image I in the state in which the character string regions R10 and R12 being the non-standard regions are masked, and hence the character strings of "538712110" and "123" are hidden from a third party. In this embodiment, when the health insurance ID card determination module 108 described later determines that the health insurance ID card C is included in the health insurance ID card image I, the masking is applied to the health insurance ID card image I, and the transmission module 107 transmits the health insurance ID card image I. When the health insurance ID card determination module 108 does not determine that the health insurance ID card C is included in the health insurance ID card image I, the photographing of the health insurance ID card C may be requested again.

Health Insurance ID Card Determination Module

The health insurance ID card determination module 108 determines that the health insurance ID card C is not included in the health insurance ID card image I when a standard character string having an unidentified standard region exists in the plurality of the standard character strings. In this embodiment, when the standard region of each of one or more standard character strings has not been identified, the health insurance ID card determination module 108 determines that the health insurance ID card C is not included in the health insurance ID card image I. Thus, when the standard regions of all of the standard character strings have been identified, the health insurance ID card determination module 108 determines that the health insurance ID card C is included in the health insurance ID card image I.

In this embodiment, the plurality of non-standard character strings are included in the health insurance ID card C, and hence the health insurance ID card determination module 108 determines that the health insurance ID card C is not included in the health insurance ID card image I when a non-standard character string having an unidentified non-standard region exists in the plurality of the non-standard character strings. In this embodiment, when the non-standard regions of one or more non-standard character strings have not been identified, the health insurance ID card determination module 108 determines that the health insurance ID card C is not included in the health insurance ID card image I. Thus, when the non-standard regions of all of the non-standard character strings have been identified, the health insurance ID card determination module 108 determines that the health insurance ID card C is included in the health insurance ID card image I.

3-2. Functions Implemented on Server

A data storage unit 200 is implemented mainly by the storage unit 22. A reception module 201 is implemented mainly by the control unit 21.

Data Storage Unit

The data storage unit 200 in this embodiment stores data required for the ekYC. For example, the data storage unit 200 stores the health insurance ID card image I received from the user terminal 10. In this embodiment, the health insurance ID card image I to which the masking has been applied is transmitted, and hence the data storage unit 200 stores the masked health insurance ID card image I.

Reception Module

The reception module 201 receives the masked health insurance ID card image I from the user terminal 10. The reception module 201 records the received health insurance ID card image I in the data storage unit 200.

4. Processing Executed in Image Processing System

Figure 10:
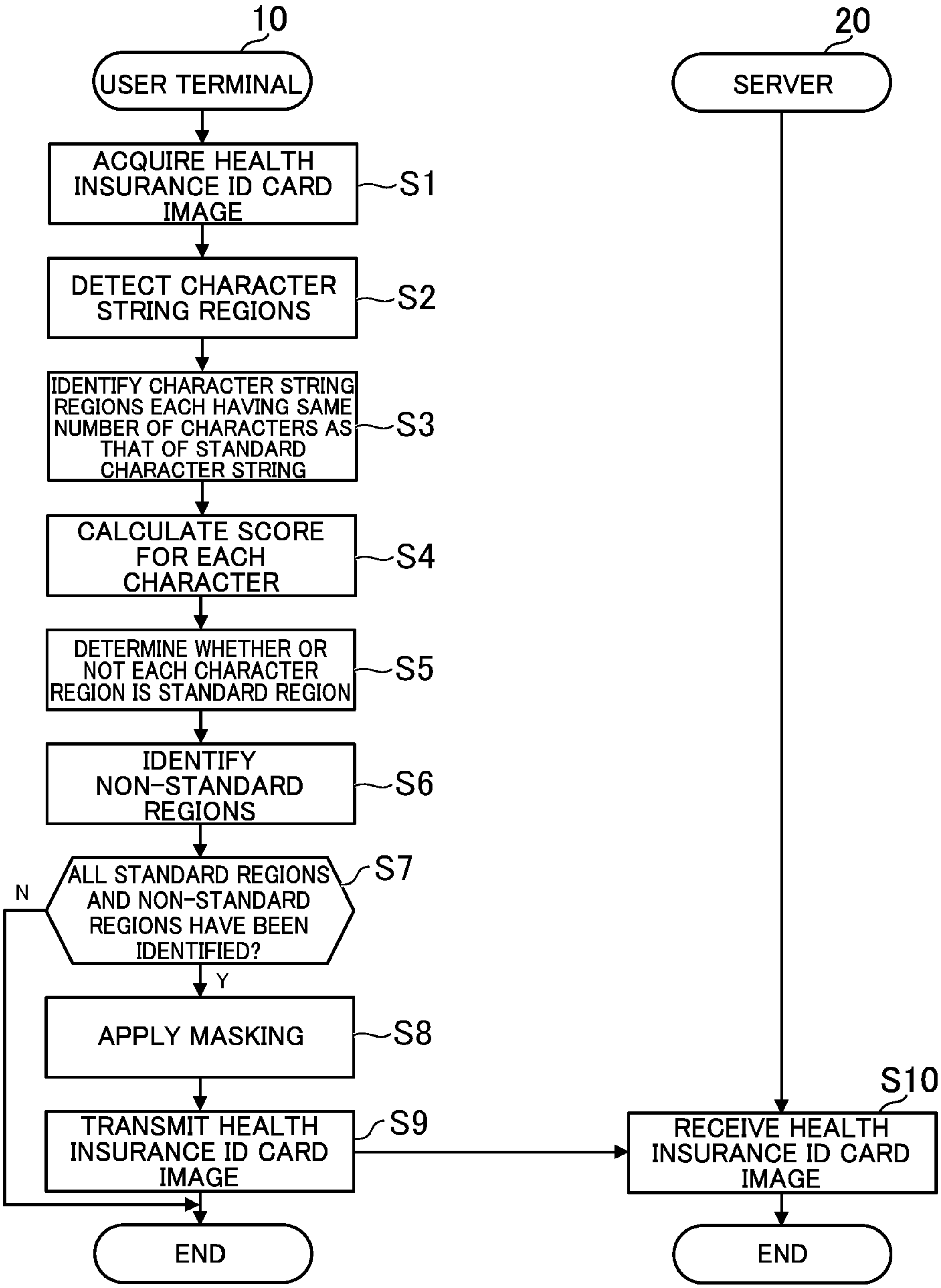
FIG. 10 is a flowchart for illustrating an example of processing executed in the image processing system.

FIG. 10 is a flow chart for illustrating an example of processing executed in the image processing system 1. As in FIG. 10, the user terminal 10 acquires the health insurance ID card image I including the health insurance ID card C, based on a result of photographing by the photographing unit 16 (Step S1). The user terminal 10 uses the method of the scene text detection to detect the plurality of character string regions R from the health insurance ID card image I (Step S2). The character string regions R detected in Step S2 are in the state as illustrated in FIG. 4. The user terminal 10 identifies the character string regions R each having the same number of characters as that of the standard character string from the plurality of character string regions R detected in Step S2 (Step S3). The character string regions R identified in Step S3 are in the state as illustrated in FIG. 5.

The user terminal 10 applies the character recognition to each of the plurality of character string regions R detected in Step S3 to calculate the score for each character (Step S4). The scores calculated in Step S4 have the content as shown in FIG. 6. The user terminal 10 determines whether or not each of the plurality of the character string regions R is the standard region based on the score of each character calculated in Step S4 (Step S5). In Step S5, as described above, it is determined whether or not the standard character string is included in the combinations of the characters each having the score in down to the fifth highest order. The character string regions R after the determination are in the state as illustrated in FIG. 7.

The user terminal 10 identifies, as the non-standard regions, the character string regions R each satisfying the predetermined positional relationship with the character string region R determined as the standard region (Step S6). In Step S6, a character string region R on or near the lines is identified as the non-standard region as illustrated in FIG. 8. The user terminal 10 determines whether or not all of the standard regions and non-standard regions have been identified (Step S7). When it is determined that any one of the standard regions and the non-standard regions has not been identified (N in Step S7), this processing is finished. In this case, the user terminal 10 may display, on the display unit 15, an error message indicating that the health insurance ID card C is not photographed in the health insurance ID card image I.

When it is determined that all of the standard regions and the non-standard regions have been identified (Y in Step S7), the user terminal 10 applies the masking to the non-standard regions (Step S8). The user terminal 10 transmits, to the server 20, the health insurance ID card image I to which the masking has been applied (Step S9). The server 20 receives the masked health insurance ID card image I, and stores the masked health insurance ID card image I in the storage unit 22 (Step S10), and this processing is finished. Subsequently, the ekYC is executed based on the health insurance ID card image I recorded in the storage unit 22.

Summary of First Configuration

As described above, the image processing system 1 includes the first configuration for accurately identifying the regions “SB” and “NB” from the health insurance ID card image I. The image processing system 1 applies the character recognition to the character string regions R detected from the health insurance ID card image I. The image processing system 1 determines, based on the score each calculated for each character included in the character string region R, whether or not the character string region R is the standard region. As a result, even when the health insurance ID card image I is such an image that the standard character string cannot be identified only through the character recognition, the standard region can reliably be identified from the health insurance ID card image I. For example, when the health insurance ID card C in the health insurance ID card image I is warped or distorted, it is difficult to identify a specific character included therein, but existence of a certain character can be identified. For example, when a character similar to another character is included in the standard character string, erroneous detection is liable to occur in the character recognition. However, the existence of a certain character can be identified. As in the case described above, even when accurate character recognition is difficult, the character string regions R which can accurately be detected are temporarily detected. The subsequent character recognition cannot be executed so accurately. However, the determination of whether or not the standard character string is included in the combinations of characters having the high scores can be made through use of not a score of the entire character string, but the score of each character, and hence the identification of the standard region is facilitated.

Moreover, the image processing system 1 identifies, for each character, the recognizable character having a relatively high score as the high-score character from the plurality of recognizable characters. The image processing system 1 determines whether or not the standard character string exists in the combinations of the high-score characters, to thereby determine whether or not the character string region R is the standard region. As a result, even when the scores of a part of characters of the standard character string are more or less low, but those characters are included in the combination of the high-score characters, the character string region R can be identified as the standard region. As a result, the identification of the standard region from the health insurance ID card image I is facilitated. When the character recognition is applied to the entire character string region R, a score is calculated for a character string including a plurality of characters as one set. In this case, a character recognition result is obtained for the entire character string as a set, and hence it is difficult to identify the standard region unless the entire standard character string is recognized as a set through the character recognition. When the character string region R9 having the two characters is exemplified and the score is calculated for each character string including the two characters, the standard character string cannot be identified unless the score of the character string including the same two characters as those of the standard character string is high. When the standard character string “SB” is exemplified, the standard character string cannot be identified unless the score of the character string “SB” including both of the first character “S” and the second character “B” is high. Meanwhile, with the first configuration, as illustrated in FIG. 6, the score is calculated for each character. Thus, even when “S” has the score in the first order as the first character, but “B” has the score in the second order as the second character, it is only required that the standard character string be included in the combination of high-score characters. Thus, it is possible to identify that the character string region R9 includes “SB.”

Moreover, the image processing system 1 identifies, for each character, as the high-score character, the recognizable character having the order of the score equal to or higher than the reference order in the character. As a result, even when the orders of the scores of a part of characters of the standard character string are more or less low, but those characters are included in the combination of the high-score characters, the character string region R can be identified as the standard region. As a result, the identification of the standard region from the health insurance ID card image I is facilitated. As in the case of the standard character string “SB” of FIG. 6, “S” has the score in the first order as the first character, but “B” has the score in the second order as the second character. Thus, the orders are mutually different from each other. However, it is possible to identify that the character string region R9 includes “SB.” As in the case of the standard character string “NB” of FIG. 6, “N” has the score in the second order as the first character, and “B” has the score in the first order as the second character. Thus, the orders are mutually different from each other. However, it is possible to identify that the character string region R11 includes “NB.”

Moreover, the image processing system 1 determines whether or not a character string region R having the same number of characters as that of the standard character string is the standard region. As a result, character string regions R each having the number of characters different from that of the standard character string are excluded from the determination target, and unnecessary processing is not executed. Accordingly, the processing load on the user terminal 10 can be reduced, and a time required until the standard regions are identified can be reduced.

Moreover, the image processing system 1 selects any one of the plurality of character string regions R and finishes the processing without selecting the next character string region R when this selected character string region R is determined as the standard region. When this selected character string region R is not determined as the standard region, the image processing system 1 selects the next character string region R, and determines whether or not the selected next character string region R is the standard region. As a result, when the standard region has been identified, the subsequent unnecessary processing is not executed. Accordingly, the processing load on the user terminal 10 can be reduced, and the time required until the standard regions are identified can be reduced.

Moreover, when a standard character string having an unidentified standard region exists in the plurality of the standard character strings, the image processing system 1 determines that the health insurance ID card C is not included in the health insurance ID card image I. As a result, it is possible to reliably identify whether or not the health insurance ID card C is included in the health insurance ID card image I. For example, when the health insurance ID card C is not included in the health insurance ID card image I or the health insurance ID card C in the health insurance ID card image I is unclear, there is a possibility that the ekYC cannot be completed and it is thus required to execute the ekYC again. The ekYC can reliably be completed by reliably identifying whether or not the health insurance ID card C is included in the health insurance ID card image I. Thus, convenience for both of the user and the administrator of the service increases.

Moreover, the image processing system 1 determines whether or not the character string region R detected from the image generated by photographing the identity verification document exemplified by the health insurance ID card C is the standard region. As a result, the standard regions can reliably be identified from the image in which the identity verification document is photographed.

Summary of Second Configuration

As described above, the image processing system 1 includes the second configuration for accurately identifying the regions of the business place reference number and the personal number from the regions of "SB" and "NB." The image processing system 1 determines whether or not the standard regions exist in the plurality of character string regions R detected from the health insurance ID card image I. The image processing system 1 identifies, when the standard region is determined to exist, a character string region R having the predetermined positional relationship with the standard region as the non-standard region. As a result, the non-standard region can be identified through use of, as a clue, the standard region which can relatively easily be identified, and hence the non-standard region can reliably be identified from the health insurance ID card image I. That is, the characters included in the non-standard character string are not known in advance, and hence it is difficult to identify the non-standard region. However, the characters included in the standard character string are known in advance, and hence the standard region can relatively easily be identified. The positional relationship between the standard character string and the non-standard character string is known in advance, and the non-standard region can accurately be identified through use of the standard region as the clue.

Moreover, when a character string region R exists in the predetermined direction with respect to the standard region and within the predetermined distance from the standard region, the image processing system 1 determines that this character string region R has the positional relationship with the standard region. As a result, when the non-standard character string exists in the predetermined direction with respect to the standard character string in the health insurance ID card C and within the predetermined distance from the standard character string, the identification of the non-standard region is facilitated.

Moreover, when a character string region R exists on or near the line obtained by extending at least one side of the standard region in the direction by the distance, the image processing system 1 determines that this character string region R has the positional relationship with the standard region. As a result, the use of the side of the standard region as the reference enables the non-standard region to be more reliably identified. The non-standard regions can be identified through relatively simple processing. Thus, the processing load on the user terminal 10 can be reduced, and the time required until the non-standard regions are identified can be reduced.

Moreover, when a character string region R exists on or near the two lines obtained by extending two sides of the standard region that oppose each other, in the direction by the distance, the image processing system 1 determines that this character string region R has the positional relationship with the standard region. As a result, the use of the plurality of sides of the standard region as the reference enables the non-standard region to be more reliably identified. The non-standard regions can be identified through relatively simple processing. Thus, the processing load on the user terminal 10 can be reduced, and the time required until the non-standard regions are identified can be reduced.

Moreover, when only one character string region R exists among the plurality of character regions R as the character string region R that is in the predetermined first positional relationship with the standard region, the image processing system 1 identifies this character string region R as the non-standard region. When there exist a plurality of character string regions R that are in the first positional relationship with the standard region, the image processing system 1 identifies, as the non-standard region, the character string region R that has the second positional relationship with the standard region among those plurality of character string regions R. As a result, even when there is a situation in which it is difficult to identify the non-standard region based only on the first positional relationship, the non-standard region can reliably be identified.

Moreover, when there exist a plurality of character string regions R which have the first positional relationship with the standard region, the image processing system 1 identifies, as the character string region R having the second positional relationship with the standard region, the character string region R that is the closest to the standard region among those plurality of character string regions R. As a result, the non-standard region can reliably be identified. For example, even when the character string regions R10 and R11 exist on the lines obtained by extending the upper and lower two sides of the character string region R9 being the standard region as illustrated in FIG. 8, the character string region R10 closer to the character string region R9 can be identified as the non-standard region.

Moreover, when a non-standard character string having an unidentified non-standard region exists in the plurality of the non-standard character strings, the image processing system 1 determines that the health insurance ID card C is not included in the health insurance ID card image I. As a result, it is possible to reliably determine that the health insurance ID card C is included in the health insurance ID card image I. For example, it is possible to prevent the transmission of the health insurance ID card image I in an insufficiently masked state.

Moreover, the image processing system 1 masks the non-standard regions. As a result, the health insurance ID card image I can be uploaded after the information intended to be hidden from the third party is masked.

Moreover, in the image processing system 1, the health insurance ID card image I is an image generated by photographing the identity verification document. As a result, the non-standard regions can reliably be identified from the image in which the identity verification document is photographed.

5. Modification Examples

The present disclosure is not limited to the embodiment described above, and can be modified suitably without departing from the spirit of the present disclosure.

5-1. Modification Examples Relating to First Configuration

Figure 11:
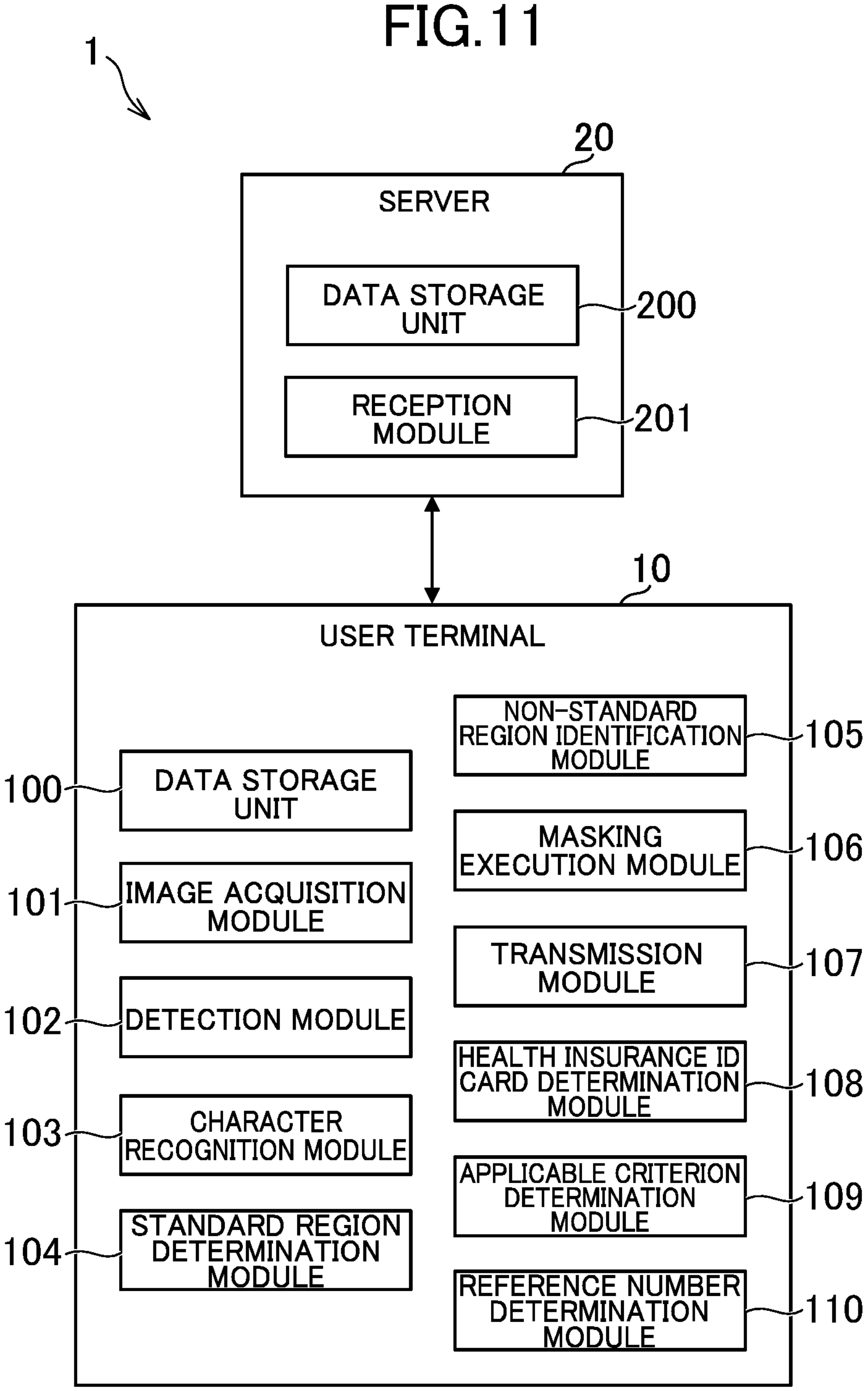
FIG. 11 is a function block diagram in modification examples relating to a first configuration.

FIG. 11 is a function block diagram in modification examples relating to the first configuration. In the modification examples relating to the first configuration, an applicable criterion determination module 109 and a reference number determination module 110 are implemented. The applicable criterion determination module 109 and the reference number determination module 110 are mainly implemented by the control unit 11.

Modification Example 1-1

For example, the standard region determination module 104 may identify, for each character, as the high-score character, the recognizable character having the score equal to or higher than the reference score in the character. That is, in the example of FIG. 6 in the embodiment, the recognizable characters in down to the fifth highest order are identified as the high-score characters, but down to which position in descending order of the score is defined as the high-score character may not be determined, and any number of recognizable characters may be defined as the high-score characters as long as those recognizable characters have scores equal to or higher than the reference score. The reference score is a score serving as a reference for identifying the high-score characters. The reference score may be any value. The reference score may be a fixed value or a variable value.

In Modification Example 1-1, the reference score is 80. In this case, when the score of each character string region R is as shown in the example of FIG. 6, the standard region determination module 104 identifies recognizable characters having scores equal to or higher than 80 as the high-score characters. Thus, the number of high-score characters changes in accordance with the character string region R and the position of the character in the character string. The embodiment and Modification Example 1-1 may be combined with each other, and the standard region determination module 104 may identify, as the high-score character, a recognizable character having a score equal to or higher than the reference score, and in an order equal to or higher than the reference order.

The image processing system 1 according to Modification Example 1-1 identifies, for each character, as the high-score character, the recognizable character having the score equal to or higher than the reference score in the character. As a result, even when the orders of some of characters of the standard character string are more or less low, but when those characters have scores equal to or higher than the reference score, those characters are classified into the high-score characters. Consequently, the identification of the standard region from the health insurance ID card image I is facilitated.

Modification Example 1-2

For example, among characters included in the standard character string, a character which is liable to be erroneously recognized as another character exists. Thus, an applicable criterion for the determination as the high-score character may not be the same for all characters, and hence may be different from one another in accordance with the character. The applicable criterion is a condition required to be satisfied by the score so that the character is classified into the high-score character. In the example of the embodiment, being in down to the fifth highest order corresponds to the applicable criterion. In the example of Modification Example 1-1, a score equal to or higher than the reference score corresponds to the applicable criterion.

The image processing system 1 includes the applicable criterion determination module 109. The applicable criterion determination module 109 determines, based on the standard character string, the applicable criterion required to be satisfied by the recognizable character for being identified as the high-score character. It is assumed that a relationship between the standard character string and the applicable criterion is defined in advance. For example, the applicable criterion determination module 109 determines the applicable criterion based on a likelihood of the erroneous recognition of the standard character string. The applicable criterion determination module 109 determines the applicable criterion such that the applicable criterion is stricter as the probability of the erroneous recognition of the standard character string is lower. Conversely, the applicable criterion determination module 109 determines the applicable criterion such that the applicable criterion is looser as the probability of the erroneous recognition of the standard character string is higher.

A strict applicable criterion corresponds to a high applicable criterion. In the example of the embodiment, a higher reference order (decrease in numerical value of reference order) corresponds to a stricter applicable criterion. In the example of Modification Example 1-1, a higher reference score corresponds to a stricter applicable criterion. A loose applicable criterion corresponds to a low applicable criterion. In the example of the embodiment, a lower reference order (increase in numerical value of reference order) corresponds to a looser applicable criterion. In the example of Modification Example 1-1, a lower reference score corresponds to a looser applicable criterion.

For example, when the standard character string is complicated, the number of characters similar in shape is small. Thus, it is considered that the erroneous recognition as another character is less liable to occur. As a result, the applicable criterion determination module 109 makes the applicable criterion stricter as the shape of the standard character string is more complicated such that the number of recognizable characters classified as the high-score characters decreases. The character having a complicated shape is easily recognized in the first place, and hence it is considered that such a situation that the standard region is not identified does not occur even when the applicable criterion is made stricter.

Meanwhile, when the standard character string is simple, the number of characters similar in shape is large. Thus, it is considered that the erroneous recognition as another character is liable to occur. As a result, the applicable criterion determination module 109 makes the applicable criterion looser as the shape of the standard character string is simpler such that the number of recognizable characters classified as the high-score characters increases. The erroneous recognition is liable to occur in a character having a simple shape, and hence it is possible to prevent, by making the applicable criterion looser, such a state that a character required to be recognized is not classified into the high-score character.

The standard region determination module 104 identifies a high-score character based on the applicable criterion determined by the applicable criterion determination module 109. Modification Example 1-2 is different from the embodiment and Modification Example 1-1 in such a point that the applicable criterion determined by the applicable criterion determination module 109 is used, but Modification Example 1-2 is the same as the embodiment and Modification Example 1-1 in the processing itself of identifying the high-score character.

The image processing system 1 according to Modification Example 1-2 identifies the high-score character based on the applicable criterion determined based on the standard character string. As a result, the high-score character can be identified based on the applicable criterion corresponding to the standard character string, and hence the standard region can more reliably be identified. For example, when the standard character string is simple, and even when the score of a character required to be recognized is in the sixth or lower order due to erroneous recognition as a similar character, this character can be classified as the high-score character by making the applicable criterion looser. Thus, such identification that this character is included in the character string region R is facilitated.

Modification Example 1-3

For example, in the embodiment, there has been described the case in which such a condition that all characters included in the standard character string exist in the combinations of high-score characters identified from a certain character string region R is set as the condition for identifying the standard region. When this condition is set, and the number of characters of the standard character string is large, the condition is excessively strict. As a result, the standard region cannot possibly be identified. For example, it is assumed that the standard character string includes ten characters. Even when all of the ten characters do not exist in the combinations of the high-score characters, but eight characters among the ten characters exist in the combinations of the high-score characters, it is considered that the character string region R is the standard region.

Thus, the standard region determination module 104 may determine that the character string region R is the standard region even when a standard character which does not exist in the combinations of the high-score characters exists in a plurality of standard characters included in the standard character string, but standard characters equal to or more than a reference number exist in the combinations. The reference number is a number serving as a criterion for determining that the character string region R is the standard region. In Modification Example 1-3, it is assumed that the reference number is a fixed value, but the reference number may be a variable value as in Modification Example 1-4 described later. In the above-mentioned example of the standard character string including the ten characters, the reference number is eight characters. The reference number may be any number. For example, the reference number may be a number approximately 70% of the number of characters of the standard character string.

For example, it is assumed that the number of standard characters included in the standard character string is "x" ("x" is an integer equal to or larger than 2). It is assumed that the reference number is "y" ("y" is an integer smaller than "x"). The standard region determination module 104 identifies the number of standard characters that exist in the combinations of the high-score characters standard characters. When the identified number is "y" or larger, the standard region determination module 104 determines that the character string region R is the standard region. When the identified number is smaller than "y", the standard region determination module 104 does not determine that the character string region R is the standard region.

The image processing system 1 according to Modification Example 1-3 determines that the character string region R is the standard region even when a standard character which does not exist in the combinations exists in the plurality of standard characters included in the standard character string, but standard characters equal to or more than the reference number exist in the combinations. As a result, when the number of characters of the standard character string is large, it is possible to prevent the state in which the condition for identifying the standard region is excessively strict, and hence the standard region cannot be identified.

Modification Example 1-4

For example, the reference number in Modification Example 1-3 may be a number corresponding to the standard character string. The image processing system 1 according to Modification Example 1-4 includes the reference number determination module 110. The reference number determination module 110 determines the reference number based on the standard character string. It is assumed that a relationship between the standard character string and the reference number is defined in advance. For example, the reference number determination module 110 determines the reference number based on the likelihood of the erroneous recognition of the standard character string. The reference number determination module 110 determines the reference number such that the reference number is smaller as the probability of the erroneous recognition of the standard character string is higher. Conversely, the reference number determination module 110 determines the reference number such that the reference number is larger as the probability of the erroneous recognition of the standard character string is lower.

For example, the reference number determination module 110 may determine the reference number based on the number of characters of the standard character string. The reference number determination module 110 determines the reference number such that the reference number is smaller as the number of characters of the standard character string is smaller. Conversely, the reference number determination module 110 determines the reference number such that the reference number is larger as the number of characters of the standard character string is larger.

The standard region determination module 104 determines whether or not the character string region R is the standard region based on the reference number determined by the reference number determination module 110. Modification Example 1-4 is different from Modification Example 1-3 in the point that the reference number determined by the reference number determination module 110 is used, but the processing itself of determining the standard region is the same as that in Modification Example 1-3.

The image processing system 1 according to Modification Example 1-4 determines whether or not the character string region R is the standard region based on the reference number determined based on the standard character string. As a result, when the number of characters of the standard character string is large, it is possible to prevent the state in which the condition for identifying the standard region is excessively strict, and hence the standard region cannot be identified.

Modification Example 1-5

For example, the case in which the score is calculated for each recognizable character has been described in the embodiment, but the standard character string is known in advance, and hence the character recognition module 103 may apply, to the character string region R, the character recognition for each of the plurality of standard characters included in the standard character string to calculate the score for each standard character. That is, the character recognition module 103 does not calculate the scores for characters other than the standard characters, but may calculate the scores only for the standard characters. In the case of "SB" and "NB" described in the embodiment, the standard characters are the three types of characters of "S", "B", and "N". The character recognition module 103 may calculate the scores only for the standard characters of those three types.

The standard region determination module 104 in Modification Example 1-5 determines whether or not a sum of the scores of the plurality of standard characters is equal to or larger than a reference sum, to thereby determine whether or not the character string region R is the standard region. The reference sum is a number serving as a criterion for determining that the character string region R is the standard region. In Modification Example 1-5, it is assumed that the reference sum is a fixed value, but the reference sum may be a variable value as in Modification Example 1-6 and Modification Example 1-7 described later. The reference sum may be any number. For example, the reference sum may be a number approximately 70% of the maximum value of the sum of the scores.

The standard region determination module 104 does not determine that the character string region R is the standard region when the sum of the scores is not determined to be equal to or larger than the reference sum. The standard region determination module 104 determines that the character string region R is the standard region when the sum of the scores is determined to be equal to or larger than the reference sum. For example, in the case of the standard character string "SB," the standard region determination module 104 determines whether or not the sum of the score of the first character "S" and the score of the second character "B" is equal to or larger than the reference sum. In the example of FIG. 6, the sum of each of the character string regions R3, R5, and the like is very small. The character string region R9 has a large sum, and hence is determined as the standard region.

The image processing system 1 according to Modification Example 1-5 determines whether or not the sum of the scores of the plurality of standard characters is equal to or larger than the reference sum, to thereby determine whether or not the character string region R is the standard region. As a result, only the standard characters included in the standard character string can be set as the calculation target of the scores, and hence the calculation of the scores of a large number of recognizable characters is not required. Accordingly, the processing load on the user terminal 10 can be reduced, and the time required until the standard regions are identified can be reduced.

Modification Example 1-6

For example, the reference sum in Modification Example 1-5 may be a value corresponding to shapes of the standard characters. The standard region determination module 104 determines whether or not the character string region R is the standard region based on the reference sum corresponding to a shape of each of the plurality of standard characters. For example, when the standard character string is complicated, the number of characters similar in shape is small. Thus, it is considered that the erroneous recognition as another character is less liable to occur. As a result, the standard region determination module 104 sets the reference sum such that the reference sum is large. The character having a complicated shape is easily recognized in the first place, and hence it is considered that the situation in which the standard region is not identified does not occur even when the reference sum is increased.

Meanwhile, when the standard character string is simple, the number of characters similar in shape is large. Thus, it is considered that the erroneous recognition as another character is liable to occur. As a result, the standard region determination module 104 sets the reference sum such that the reference sum is small. The erroneous recognition is liable to occur in a character having a simple shape, and hence it is possible to prevent, by reducing the reference sum, such a state that the identification of the standard region is difficult. Modification Example 1-6 is different from Modification Example 1-5 in the point that the reference sum is set in correspondence to the shapes of the standard characters, but the processing itself of determining the standard region is the same as that in Modification Example 1-5.

The image processing system 1 according to Modification Example 1-6 determines whether or not the character string region R is the standard region based on the reference sum corresponding to the shape of each of the plurality of standard characters. As a result, the standard region can more reliably be identified through use of the reference sum corresponding to the shapes of the standard characters. For example, it is possible to prevent the state in which the identification of the standard region is difficult even when the standard character string is simple.

Modification Example 1-7

For example, the standard region determination module 104 may determine whether or not the character string region R is the standard region based on the reference sum corresponding to the number of standard characters included in the standard character string. The standard region determination module 104 sets the reference sum such that the reference sum is larger as the number of standard characters included in the standard character string is larger. Conversely, the standard region determination module 104 sets the reference sum such that the reference sum is smaller as the number of regular characters included in the standard character string is smaller. Modification Example 1-7 is different from Modification Example 1-5 in the point that the reference sum corresponding to the number of standard characters is set, but the processing itself of determining the standard region is the same as that in Modification Example 1-5.

The image processing system 1 according to Modification Example 1-7 determines whether or not the character string region R is the standard region based on the reference sum corresponding to the number of standard characters included in the standard character string. As a result, the standard region can more reliably be identified through use of the reference sum corresponding to the number of the standard characters.

Modification Example 1-8

For example, the plurality of standard characters included in the standard character string are included in the plurality of recognizable characters as described in the embodiment.

The character recognition module 103 may apply, to the character string region R, character recognition relating to each of the plurality of standard characters to calculate the score for each standard character. The standard region determination module 104 may determine whether or not the character string region R is the standard region based on the score calculated for each standard character. The calculation of the score in this case is applied to only the standard character as in Modification Example 1-5. The standard region determination module 104 may determine whether or not the character string region R is the standard region based not on the sum of the scores as in Modification Example 1-5, but on another index such as an average value of the scores.

The image processing system 1 according to Modification Example 1-8 determines whether or not the character string region R is the standard region based on the score calculated for each standard character. As a result, only the standard characters included in the standard character string can be set as the calculation target of the scores, and hence the calculation of the scores of a large number of recognizable characters is not required. Accordingly, the processing load on the user terminal 10 can be reduced, and the time required until the standard regions are identified can be reduced.

Modification Example 1-9

For example, the case in which the character string region R corresponding to the number of characters of the standard character string is detected has been described in the embodiment, but the detection module 102 may detect the character string region R having a size corresponding to the standard character string. The standard region determination module 104 may determine whether or not the character string region R having the size corresponding to the standard character string is the standard region. It is assumed that the size corresponding to the standard character string is defined in advance in the data storage unit 100.

For example, for the standard character string including two characters such as "SB" and "NB" described in the embodiment, a size corresponding to about two characters is defined. The standard region determination module 104 considers, as the target of the determination of whether or not the character string region R is the standard region, a character string region R that has a difference from the size corresponding to the standard character string smaller than a predetermined difference among all of the character string regions R detected from the health insurance ID card image I. A character string region R having a greatly different size is not considered as the determination target.

The image processing system 1 according to Modification Example 1-9 determines whether or not the character string region R having the size corresponding to the standard character string is the standard region. As a result, character string regions R each having a size different from that of the standard character string are excluded from the determination target, and hence unnecessary processing is not executed. Accordingly, the processing load on the user terminal 10 can be reduced, and a time required until the standard regions are identified can be reduced.

5-2. Modification Example Relating to Second Configuration

Figure 12:
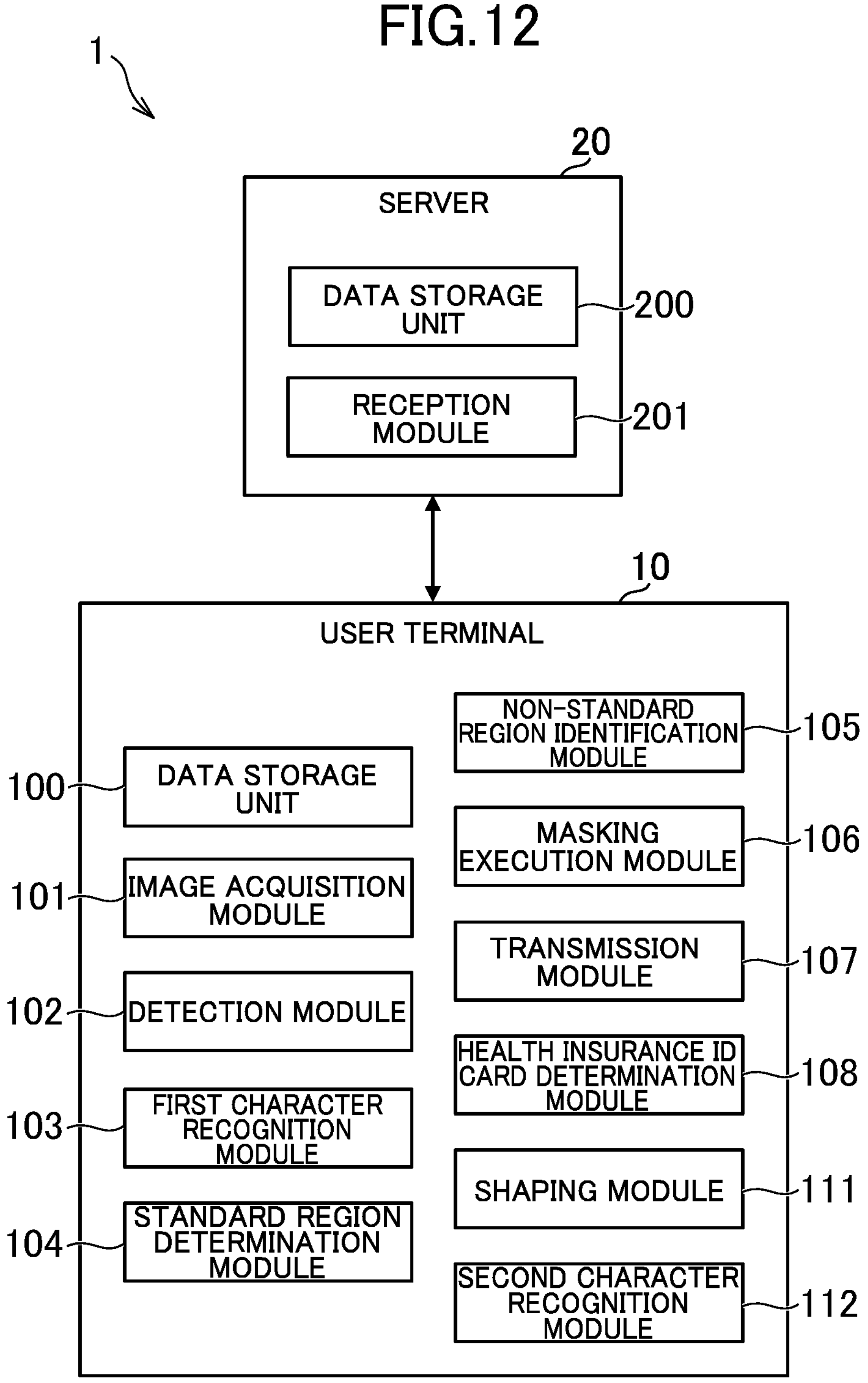
FIG. 12 is a function block diagram in modification examples relating to a second configuration.

FIG. 12 is a function block diagram in modification examples relating to the second configuration. In the modification examples relating to the second configuration, the character recognition module 103 in the embodiment and Modification Examples 1-1 to 1-9 is referred to as "first character recognition module 103." In the modification examples relating to the second configuration, a shaping module 111 and a second character recognition module 112 are implemented. The shaping module 111 and the second character recognition module 112 are implemented by mainly the control unit 11.

Modification Example 2-1

For example, in the embodiment, the case in which the non-standard regions are masked has been described. To the non-standard region, image processing other than the masking may be applied. In Modification Example 2-1, the case in which character recognition is applied to the non-standard regions is described. In the ekYC in the embodiment, the non-standard character strings are not used, but in the ekYC in Modification Example 2-1, a case in which the non-standard character strings are used is exemplified. For example, the business place reference number and the personal number of the health insurance ID card C are used in the ekYC.

The image processing system 1 according to Modification Example 2-1 includes the second character recognition module 112. The second character recognition module 112 applies the character recognition to the non-standard regions. The character recognition itself may be the same as that of the first character recognition module 103. The second character recognition module 112 applies the character recognition to the non-standard region to recognize the non-standard character string included in the non-standard region. For example, the second character recognition module 112 identifies the recognizable character having the highest score for each character included in the non-standard region. The second character recognition module 112 recognizes, as the non-standard character string, a character string obtained by arranging the recognizable characters having the highest scores.

The transmission module 107 transmits, to the server 20, the non-standard character strings recognized by the second character recognition module 112. When the reception module receives the non-standard character strings, the reception module records the non-standard character strings in the data storage unit 200. The non-standard character strings are used in the eKYC. Also in Modification Example 2-1, not only the non-standard character strings, but also the health insurance ID card image I may be transmitted to the server 20.

The image processing system 1 according to Modification Example 2-1 applies the character recognition to the non-standard region having the predetermined positional relationship with the standard region. As a result, the character recognition can be applied to the non-standard region after the non-standard region is reliably identified, and hence the non-standard character string can reliably be recognized.

Modification Example 2-2

For example, when the health insurance ID card C in the health insurance ID card image I is warped or distorted, each character in the non-standard regions may also be warped or distorted. In this case, even when the application of the character recognition to the non-standard region is tried as in Modification Example 2-1, the non-standard character string may not accurately be recognized. Thus, it is conceivable to shape the non-standard region such that the non-standard region takes a shape for facilitating the character recognition.

However, it is often unknown what the non-standard character string specifically is, and hence the shape and the size of the non-standard region are often undetermined. Meanwhile, the standard character string is known in advance, and hence the shape and the size of the standard region are known in advance. Thus, transform corresponding to a difference between an actually identified standard region and an exemplar region relating to an exemplar of the standard region may be applied to the actually identified standard region.

Figure 13:
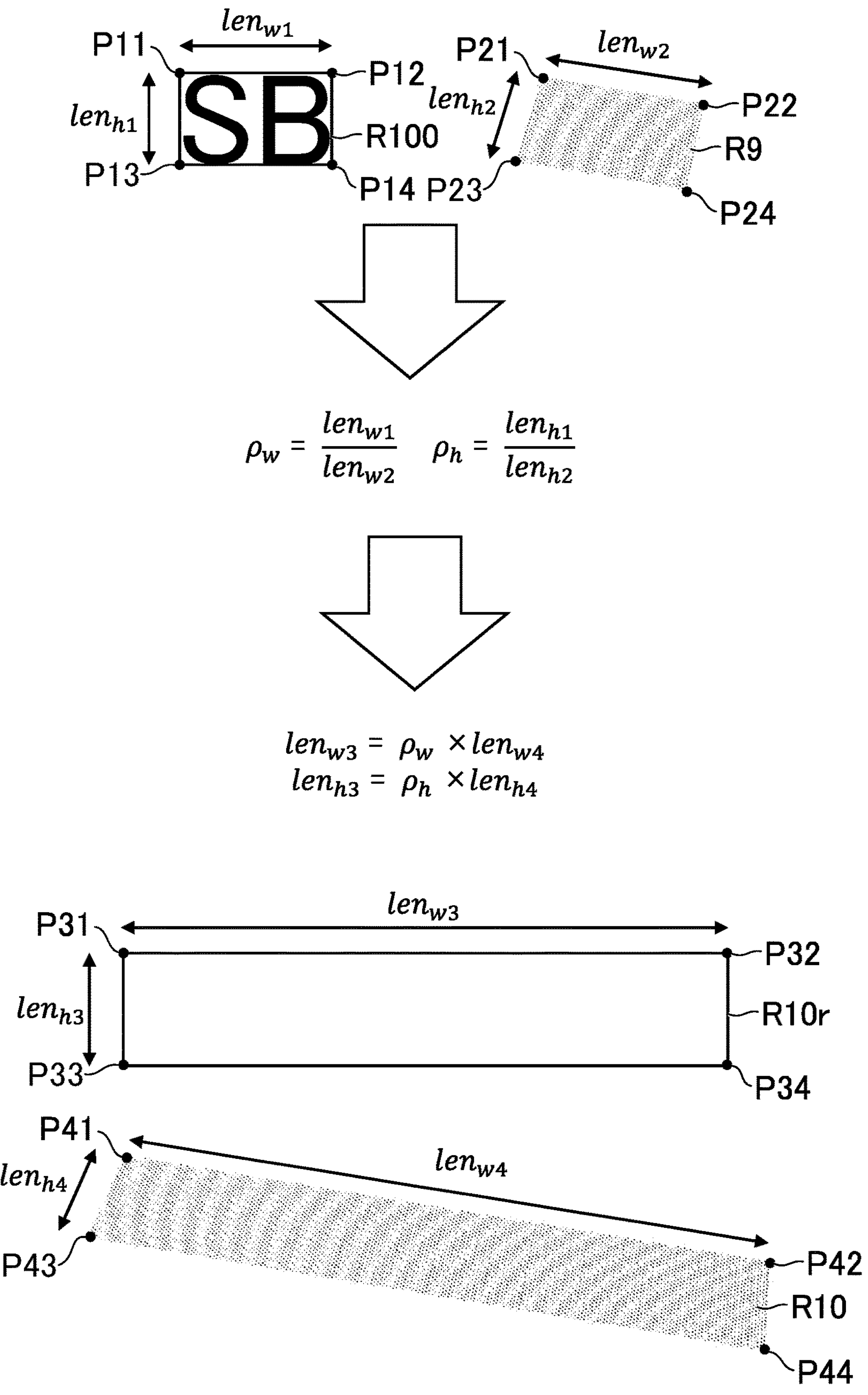
FIG. 13 is a view for illustrating an example of processing of shaping the non-standard region.
Figure 14:
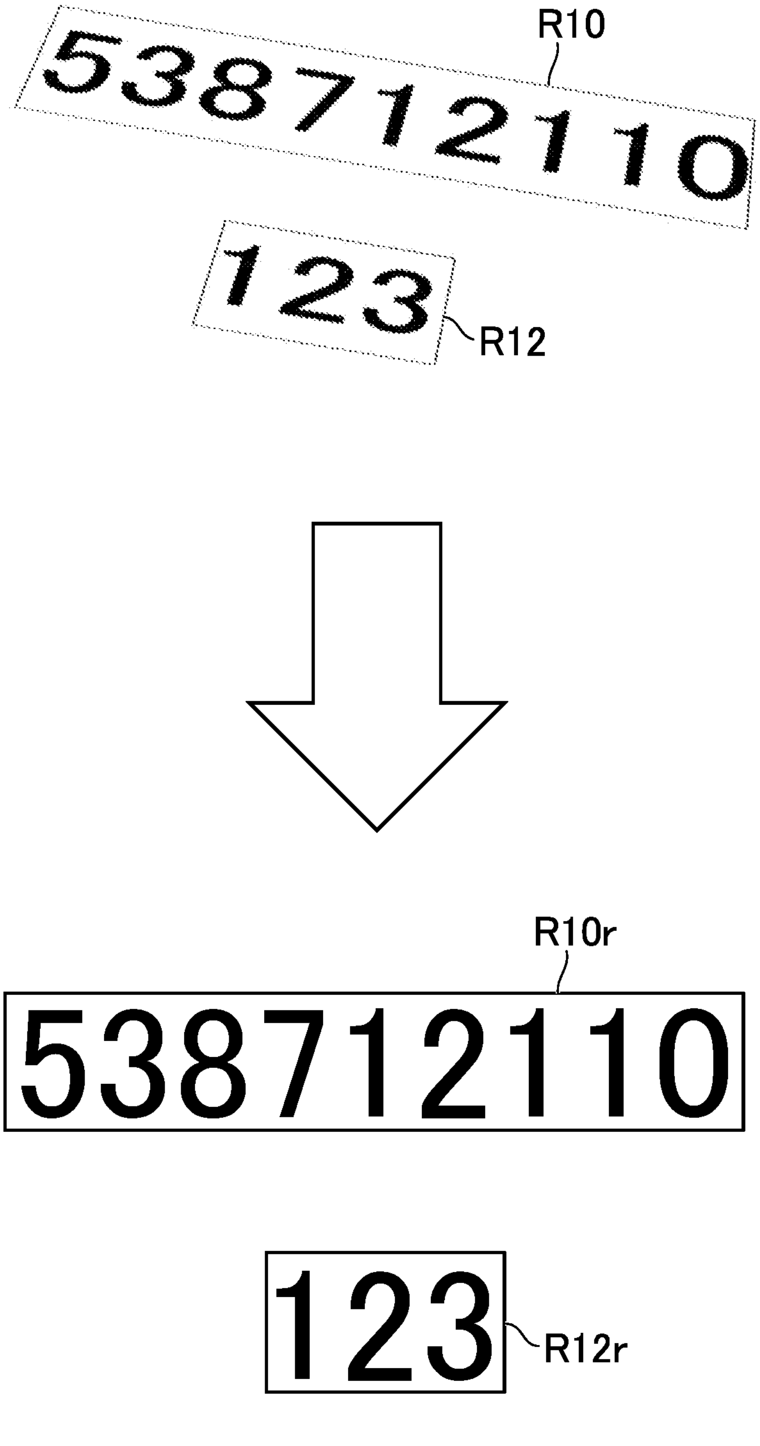
FIG. 14 is a view for illustrating an example of the processing of shaping the non-standard region.

FIG. 13 and FIG. 14 are views for illustrating an example of the processing of shaping the non-standard region. The image processing system 1 according to Modification Example 2-2 includes the shaping module 111. In the example of FIG. 13, description is given of a case in which the shaping module 111 shapes the character string region R10 being the non-standard region based on the character string region R9 being the standard region and an exemplar region R100. The exemplar region R100 is a region in which the standard character string appears in a captured image in a case in which the health insurance ID card C is imaged from the front side.

In the example of FIG. 13, "SB" being the standard character string is shown in the exemplar region R100. In the example of the embodiment, not only the character string region R9, but also the character string region R11 corresponds to the standard region, and hence, when the character string regions R9 and R11 are not distinguished from each other, each of the character string regions R9 and R11 is hereinafter simply referred to as "standard region." An exemplar region for "NB" being the standard character string included in the character string region R11 is also prepared. In the following, when description of not the exemplar region R100 of FIG. 13, but an exemplar region including also the exemplar region of "NB" is given, the exemplar region is described without reference symbol R100.

In Modification Example 2-2, description is given of a case in which each of the standard region and the exemplar region is a quadrangle. The exemplar region may have any shape similarly to the standard region. For example, the exemplar region is a rectangle or a square. The standard region may be a rectangle or a square, but may be a quadrangle having angles of not 90 degrees at four corners when warp or distortion occurs in the health insurance ID card C in the health insurance ID card image I.

The shaping module 111 determines transform coefficients for transforming the non-standard region based on the difference between the standard region and the exemplar region. For example, the shaping module 111 determines the transform coefficients based on a difference between a positional relationship among points P11 to P14 at the four corners of the exemplar region and a positional relationship among points P21 to P24 at the four corners of the standard region. The shaping module 111 transforms points P41 to P44 at the four corners of the standard region based on the determined transform coefficients, to thereby obtain points P31 to P34 of the standard region after the shaping.

For example, the shaping module 111 shapes the non-standard region based on a width of the standard region and a width of the exemplar region. The shaping module 111 determines the transform coefficients based on a difference between the width of the standard region and the width of the exemplar region. The shaping module 111 shapes the non-standard region based on the determined transform coefficients. In the example of FIG. 13, description is given of a case in which both of a vertical width and a horizontal width are used, but only any one of the vertical width or the horizontal width may be used for the shaping.

For example, the shaping module 111 calculates a width $len_{w1}$ and a width $len_{h1}$ of the exemplar region R100. The width $len_{w1}$ is a distance between the point P11 and the point P12 or a distance between the point P13 and the point P14. The width $len_{h1}$ is a distance between the point P11 and the point P13 or a distance between the point P12 and the point P14. The shaping module 111 calculates a width $len_{w2}$ and a width $len_{h2}$ of the character string region R9 being the standard region. The width $len_{w2}$ is a distance between the point P21 and the point P22 or a distance between the point P23 and the point P24. The width $len_{h2}$ is a distance between the point P21 and the point P23 or a distance between the point P22 and the point P24.

As illustrated in FIG. 13, the shaping module 111 calculates a ratio pw of the width $len_{w1}$ to the width $len_{w2}$. The shaping module 111 calculates a ratio $\rho_h$ of the width $len_{h1}$ to the width $len_{h2}$. The shaping module 111 calculates a width $len_{w4}$ and a width $len_{h4}$ of the character string region R100 being the non-standard region. The shaping module 111 sets a value obtained by multiplying the ratio pw by the width $len_{w4}$ as a horizontal width $len_{w3}$ of a character string region R10*r* being a non-standard region after the shaping. The shaping module 111 sets a value obtained by multiplying the ratio on by the width $len_{h4}$ as a vertical width $len_{h3}$ of the character string region R10*r*.

The shaping the transform module 111 calculates coefficients based on the positional relationship between the points P31 to P34 at four corners of the character string region R10*r* and the points P41 to P44 at the four corners of the character string region R10. It is only required to calculate those transform coefficients as given by calculation expressions used for transform such as the affine transform. The shaping module 111 uses the calculated transform coefficients to transform the character string region R10, to thereby shape the character string region R10. The shaping module 111 calculates the transform coefficients through the same steps also for the character string region R12, and transforms the character string region R12, to thereby shape the character string region R12. Character string regions R10*r* and R12*r* after the shaping are as illustrated in FIG. 14. When the state of FIG. 14 is brought about, each character string faces front, and is thus in a state for facilitating the character recognition.

As described above, similarly to the embodiment, the health insurance ID card C in Modification Example 2-2 includes the first standard character string "SB," the second standard character string "NB," the first non-standard character string "538712110," and the second non-standard character string "123." The standard region determination module 104 determines whether or not the first standard region including the first standard character string and the second standard region including the second standard character string exist in the plurality of character string regions R. This determination method is as described in the embodiment.

The non-standard region identification module 105 identifies, when the first standard region and the second standard region are determined to exist, the character string region R having the predetermined positional relationship with the first standard region as the first non-standard region including the first non-standard character string. The non-standard region identification module 105 identifies the character string region R having the predetermined positional relationship with the second standard region as the second non-standard region including the second non-standard character string. This identification method is also as described in the embodiment.

The shaping module 111 determines the transform coefficients relating to the shaping of the first non-standard region based on the first standard region and the first exemplar region relating to the exemplar of the first standard region. The shaping module 111 shapes the first non-standard region based on the determined transform coefficients. The shaping module 111 shapes also the second non-standard region based on the determined transform coefficients. For example, the shaping module 111 uses the transform coefficients determined based on the positional relationship among the points P31 to P34 of FIG. 13 and the positional relationship among the points P41 to P44 for not only the shaping of the character string region R10, but also the shaping of the character string region R12. The second character recognition module 112 applies the character recognition to the shaped non-standard regions. In the example of FIG. 14, the second character recognition module 112 applies the character recognition to each of the shaped character string regions R10*r* and R12*r*.

The image processing system 1 according to Modification Example 2-2 shapes the non-standard region based on the standard region and the exemplar region. As a result, the non-standard region can be caused to have the same shape as that of the region of the non-standard characters included in the captured image when the image of the health insurance ID card C is photographed in a predetermined state. For example, as in Modification Example 2-2, when the character recognition is applied to the non-standard regions, the non-standard region in the state for facilitating the character recognition is brought about. As a result, the accuracy of the character recognition increases.

Moreover, the image processing system 1 shapes the non-standard region based on the widths of the standard region and the widths of the exemplar region. The shaping is achieved through simple calculation by focusing on the widths, and the the shaping of the non-standard region also accuracy of increases.

Moreover, the image processing system 1 shapes also the second non-standard region based on the transform coefficients determined based on the first standard region and the first exemplar region relating to the exemplar of the first standard region. As a result, the calculation of the transform coefficients for the second non-standard region is not required. Thus, the processing load on the user terminal 10 can be reduced, and the time required until the non-standard regions are identified can be reduced.

Modification Example 2-3

For example, the reuse of the transform coefficients for the character string region R10 as in Modification Example 2-2 may be avoided, and transform coefficients may be calculated also for the character string region R12. The transform coefficients for the character string region R10 are hereinafter referred to as "first transform coefficients." The transform coefficients for the character string region R12 are hereinafter referred to as "second transform coefficients." The calculation method for the second transform coefficients is different from the calculation method for the first transform coefficients in such a point that the character string region R11 corresponds to the standard region and an exemplar image of this standard region are used, but the calculation method itself is the same. Thus, the second transform coefficients are calculated based on the same flow as that of FIG. 13.

The shaping module 111 determines the transform coefficients relating to the shaping of the first non-standard region based on the first standard region and the first exemplar region relating to the exemplar of the first standard region, and shapes the first non-standard region based on the determined first transform coefficients. This flow is as described in Modification Example 2-2. The shaping module 111 determines the second transform coefficients relating to the shaping of the second non-standard region based on the second standard region and the second exemplar region relating to the exemplar of the second standard region, and shapes the second non-standard region based on the determined second transform coefficients. The shaping module 111 is only required to determine the second transform coefficients based on the same flow as that of FIG. 13 to shape the second non-standard region.

The image processing system 1 according to Modification Example 2-3 determines the second transform coefficients relating to the shaping of the second non-standard region based on the second standard region and the second exemplar region relating to the exemplar of the second standard region, and shapes the second non-standard region based on the determined second transform coefficients. As a result, the transform coefficients for the second non-standard region are used, and hence an accuracy of the shaping applied to the second non-standard region increases.

Modification Example 2-4

For example, an approximate number of characters included in the non-standard character string may be known in advance. Thus, a character string region R having an excessively small number or an excessively large number of characters as the non-standard character string may be excluded from the determination for the non-standard region. For example, the business place reference number of the health insurance ID card C often includes from about five characters to about ten characters. The personal number of the health insurance ID card C often includes from about one character to about five characters. Thus, when a character string region R having the number of characters larger than ten is detected, a probability that this character string region R is a non-standard region is low. Thus, this character string region R may be excluded from the determination target for the non-standard region.

The non-standard region identification module 105 identifies a character string region R having the number of characters corresponding to the non-standard character string from the plurality of character string regions R, and identifies the identified character string region R as the non-standard region when the identified character string region R has the positional relationship with the standard region. It is assumed that the number of characters corresponding to the non-standard character string is stored in advance in the data storage unit 100. The non-standard region identification module 105 determines whether or not the number of characters included in the character string region R is the number of characters corresponding to the non-standard character string. The non-standard region identification module 105 considers a character string region R having the number of characters corresponding to the non-standard character string as the target of the determination of whether or not the character string region R is the non-standard region. The non-standard region identification module 105 excludes a character string region R not having the number of characters corresponding to the non-standard character string from the target of the determination of whether or not the character string region R is the non-standard region.

The image processing system 1 according to Modification Example 2-4 identifies a character string region R having the number of characters corresponding to the non-standard character string from the plurality of character string regions R, and identifies the identified character string region R as the non-standard region when the identified character string region R has the positional relationship with the standard region. As a result, character string regions R each considered not to include a non-standard character string are excluded from the determination target, and unnecessary processing is not executed. Thus, the processing load on the user terminal 10 can be reduced, and a time required until the non-standard regions are identified can be reduced.

Modification Example 2-5

For example, the non-standard region identification module 105 may identify a character string region R having a size corresponding to the non-standard character string from the plurality of character string regions R, and may identify the identified character string region R as the non-standard region when the identified character string region R has the positional relationship with the standard region. For example, when the size of the character string included in a character string region R obviously exceeds 10 characters instead of the number of characters as described in Modification Example 2-4, this character string region R may be excluded from the determination target for the non-standard region.

It is assumed that the size corresponding to the non-standard character string is stored in advance in the data storage unit 100. The non-standard region identification module 105 determines whether or not the size of the character string region R is the size corresponding to the non-standard character string. The non-standard region identification module 105 sets the character string region R having the size corresponding to the non-standard character string as the target of the determination of whether or not the character string region R is the non-standard region. The non-standard region identification module 105 excludes a character string region R not having the size corresponding to the non-standard character string from the target of the determination of whether or not the character string region R is the non-standard region.

In the image processing system 1 according to Modification Example 2-5, the non-standard region identification module 105 identifies a character string region R having the size corresponding to the non-standard character string from the plurality of character string regions R, and identifies the identified character string region R as the non-standard region when the identified character string region R has the positional relationship with the standard region. As a result, character string regions R each having a size different from that of the non-standard character string are excluded from the determination target, and unnecessary processing is not executed. Thus, the processing load on the user terminal 10 can be reduced, and a time required until the non-standard regions are identified can be reduced.

5-3. Other Modification Examples

For example, the above-mentioned modification examples may be combined with each other.

For example, the image processing system 1 may not include the second configuration, but may include the first configuration. In this case, the image processing system 1 does not identify the non-standard regions, and identifies the standard regions. The standard regions can be used for various purposes. For example, the image processing system 1 may use the standard regions in order to determine whether or not the health insurance ID card C is shown in the health insurance ID card image I. In this case, the non-standard regions may not be identified, and it may be determined that the health insurance ID card C is shown in the health insurance ID card image I when the standard regions corresponding to the standard character string regions printed on the health insurance ID card C are identified. Moreover, for example, the image processing system 1 may shape the health insurance ID card image I based on the standard regions when the health insurance ID card C in the health insurance ID card image I is warped or distorted. In this case, the image processing system 1 shapes the health insurance ID card image I so that a positional relationship among the plurality of standard regions reaches a predetermined positional relationship.

For example, the image processing system 1 may not include the first configuration, but may include the second configuration. In this case, the image processing system 1 identifies the standard region through use of another method different from that of the first configuration, and identifies the non-standard region based on the identified standard region. As the another method, any method can be used. For example, a method that uses a template image, a method that uses the character recognition, or a method that uses a machine learning model may be used. In this case, the image processing system 1 can identify the standard regions even when the image processing system 1 does not include the first configuration. Thus, the image processing system is not required to include both of the first configuration and the second configuration. That is, the image processing system may include only the first configuration, and may include only the second configuration.

For example, although a case in which main processing is executed on the user terminal 10 is described in the embodiment, the processing described as processing to be executed on the user terminal 10 may be executed on the server 20. That is, the server 20 may have the first configuration and the second configuration. For example, the user terminal 10 may have the first configuration and the server 20 may have the second configuration to divide processing between the user terminal 10 and the server 20. Conversely, the user terminal 10 may have the second configuration and the server 20 may have the first configuration to divide processing between the user terminal 10 and the server 20. When the processing is divided, the health insurance ID card image I and other types of data are to be transmitted appropriately between the user terminal 10 and the server 20.

The invention claimed is:

1. An image processing system, comprising at least one processor configured to:

retrieve, from a data storage unit, pre-stored information indicating a standard character string;

detect a character string region including any character string from a target object image relating to a target object including a standard character string;

apply character recognition to the character string region to calculate a score indicating a correctness of the character recognition for each recognizable character included in the character string region;

wherein the character recognition is configured to recognize a plurality of recognizable characters, identify, for the each character, a recognizable character having a relatively high score as a high-score character from the plurality of recognizable;

determine whether the character string region is a standard region including the retrieved standard character string by determining whether the standard character string exists in a combination of the high-score characters;

wherein the character string region comprises a plurality of pixels; and wherein the score is calculated based on a number of pixels matching a template image, a difference in a color from the template image in a pixel among the plurality of pixels, a machine learning model, or a difference from a shape serving as a reference.

2. The image processing system according to claim 1, wherein the at least one processor is configured to identify, for the each character, as the high-score character, a recognizable character having an order of the score equal to or higher than a reference order in the each character.

3. The image processing system according to claim 1, wherein the at least one processor is configured to identify, for the each character, as the high-score character, a recognizable character having the score equal to or higher than a reference score in the each character.

4. The image processing system according to claim 1, wherein the at least one processor is configured to:

determine, based on the standard character string, an applicable criterion that a recognizable character is required to satisfy as the high-score character, and identify the high-score character based on the applicable criterion.

5. The image processing system according to claim 1, wherein the at least one processor is configured to determine that the character string region is the standard region when, even in a case in which a standard character absent from the combination exists in a plurality of standard characters included in the standard character string, the number of standard characters existing in the combination is equal to or larger than a reference number.

6. The image processing system according to claim 5, wherein the at least one processor is configured to:

determine the reference number based on the standard character string, and determine whether the character string region is the standard region based on the reference number.

7. The image processing system according to claim 1, wherein the at least one processor is configured to:

apply, to the character string region, the character recognition relating to each of a plurality of standard characters included in the standard character string to calculate the score for the each of the plurality of standard characters, and determine whether a sum of the scores of the plurality of standard characters is equal to or larger than a reference sum, to thereby determine whether the character string region is the standard region.

8. The image processing system according to claim 7, wherein the at least one processor is configured to determine whether the character string region is the standard region based on the reference sum corresponding to a shape of each of the plurality of standard characters.

9. The image processing system according to claim 7, wherein the at least one processor is configured to determine whether the character string region is the standard region based on the reference sum corresponding to the number of standard characters included in the standard character string.

10. The image processing system according to claim 1, wherein the character recognition is configured to recognize a plurality of recognizable characters, wherein the plurality of recognizable characters include a plurality of standard characters included in the standard character string, wherein the at least one processor is configured to:

apply, to the character string region, the character recognition relating to each of the plurality of standard characters to calculate the score for the each of the plurality of standard characters, and determine whether the character string region is the standard region based on the score calculated for the each of the plurality of standard characters.

11. The image processing system according to claim 1, wherein the at least one processor is configured to:

detect the character string region having the same number of characters as the number of characters of the standard character string, and determine whether the character string region having the same number of characters as the number of characters of the standard character string is the standard region.

12. The image processing system according to claim 1, wherein the at least one processor is configured to:

detect the character string region having a size corresponding to the standard character string, and determine whether the character string region having the size corresponding to the standard character string is the standard region.

13. The image processing system according to claim 1, wherein the at least one processor is configured to:

detect a plurality of character string regions each of which is the character string region, select any one of the plurality of character string regions to determine whether the selected one of the plurality of character string regions is the standard region;

finish processing without selecting a next character string region when the selected one of the plurality of character string regions is determined as the standard region; and select, when the selected one of the plurality of character string regions is not determined as the standard region, a next character string region to determine whether the selected next character string region is the standard region.

14. The image processing system according to claim 1, wherein the target object includes a plurality of standard character strings each of which is the standard character string, wherein the at least one processor is configured to:

detect a plurality of character string regions each of which is the character string region, determine, for each standard character string, whether the character string region is the standard region including the each standard character string, and determine that the target object is not included in the target object image when the standard character string having an unidentified standard region exists in the plurality of standard character strings.

15. The image processing system according to claim 1, wherein the target object is an identity verification document, wherein the standard character string is a character string relating to information required for identity verification, and wherein the target object image is an image generated by photographing the identity verification document.

16. An image processing method, comprising:

retrieving, from a data storage unit, pre-stored information indicating a standard character string;

detecting a character string region including any character string from a target object image relating to a target object including a standard character string;

applying character recognition to the character string region to calculate a score indicating a correctness of the character recognition for each recognizable character included in the character string region;

wherein the character recognition is configured to recognize a plurality of recognizable characters, identifying, for the each character, a recognizable character having a relatively high score as a high-score character from the plurality of recognizable characters, determining whether the character string region is a standard region including the retrieved standard character string by determining whether the standard character string exists in a combination of the high-score characters;

wherein the character string region comprises a plurality pixels; and wherein the score is calculated based on a number of pixels matching a template image, a difference in a color from the template image in a pixel among the plurality of pixels, a machine learning model, or a difference from a shape serving as a reference.

17. A non-transitory computer-readable information storage medium for storing a program for causing a computer to:

retrieve, from a data storage unit, pre-stored information indicating a standard character string;

detect a character string region including any character string from a target object image relating to a target object including a standard character string;

apply character recognition to the character string region to calculate a score indicating a correctness of the character recognition for each recognizable character included in the character string region;

wherein the character recognition is configured to recognize a plurality of recognizable characters, identify, for the each character, a recognizable character having a relatively high score as a high-score character from the plurality of recognizable characters:

determine whether the character string region is a standard region including the retrieved standard character string by determining whether the standard character string exists in a combination of the high-score characters;

wherein the character string region comprises a plurality of pixels; and wherein the score is calculated based on a number of pixels matching a template image a difference in a color from the template image in a pixel among the plurality of pixels a machine learning model, or a difference from a shape serving as a reference.

18. The image processing system according to claim 1, wherein the at least one processor is configured to:

detect a character string region by inputting the target object image into a trained machine learning model to output a first heat map indicating a probability that a first pixel indicates a character and a second heat map indicating a probability that a second pixel indicates a blank space between characters;

identify, based on the first heat map, first regions estimated as characters and, based on the second heat map, second regions estimated as blanks between the characters; and connect the first regions and the second regions to detect the character string region.

19. The image processing system according to claim 1, wherein the at least one processor is configured to:

apply character recognition using optical character recognition or intelligent character recognition, and wherein the method of character recognition is executed using a machine learning model, template images, or a shape features of lines.

* * * * *